United States Patent
Ishii et al.

(10) Patent No.: US 8,059,611 B2
(45) Date of Patent: Nov. 15, 2011

(54) MAINTAINING A CONSTANT TRANSMISSION POWER DENSITY OF A DATA SIGNAL UTILIZING PROHIBITED SUBCARRIERS

(75) Inventors: Hiroyuki Ishii, Yokosuka (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 101 days.

(21) Appl. No.: 12/528,961

(22) PCT Filed: Feb. 19, 2008

(86) PCT No.: PCT/JP2008/052742
§ 371 (c)(1),
(2), (4) Date: Oct. 21, 2009

(87) PCT Pub. No.: WO2008/105267
PCT Pub. Date: Sep. 4, 2008

(65) Prior Publication Data
US 2010/0034077 A1    Feb. 11, 2010

(30) Foreign Application Priority Data

Feb. 28, 2007 (JP) .............................. 2007-050837
Mar. 19, 2007 (JP) .............................. 2007-071589

(51) Int. Cl.
*H04W 4/00* (2009.01)
(52) U.S. Cl. ....................................... 370/334; 370/208
(58) Field of Classification Search ................. None
See application file for complete search history.

(56) References Cited

U.S. PATENT DOCUMENTS

| | | | |
|---|---|---|---|
| 2008/0039129 A1* | 2/2008 | Li et al. | 455/522 |
| 2008/0176575 A1* | 7/2008 | Sutton | 455/450 |
| 2010/0027512 A1* | 2/2010 | Kishiyama et al. | 370/336 |
| 2010/0238877 A1* | 9/2010 | Nam et al. | 370/329 |

FOREIGN PATENT DOCUMENTS

| | | |
|---|---|---|
| JP | 2003-032218 A | 1/2003 |
| WO | 2004/077728 A2 | 9/2004 |

OTHER PUBLICATIONS

NTT DoCoMo et al., "Power Boosting of Reference Signal in E-UTRA Downlink," 3GPP TSG RAN WG1 Meeting #47bis, R1-070088, Sorrento, Italy; Jan. 15-19, 2007, 5 pages. Evolved Universal Terrestrial Radio Access (E-UTRA); "Physical Channels and Modulation," (marked-up version showing changes), 3GPP TS 36.211 V0.3.1, Feb. 6, 2007, 28 pages.

(Continued)

*Primary Examiner* — Donald Mills
(74) *Attorney, Agent, or Firm* — Osha • Liang LLP

(57) ABSTRACT

A base station apparatus is used in a mobile communication system that uses an OFDM scheme in a downlink. The base station apparatus includes: a unit configured to perform inverse Fourier transform on a signal in which a first signal and a second signal is mapped to subcarriers with different transmission power density, and to generate a transmission signal; and a transmission unit configured to transmit the transmission signal to a user apparatus. A subcarrier (prohibited subcarrier) in which mapping of the second signal is prohibited is determined such that transmission power density of the second signal is kept constant among a plurality of OFDM symbols regardless of whether the first signal is included in an OFDM symbol including the second signal. The prohibited subcarrier is determined based on a subcarrier to which the first signal is mapped.

6 Claims, 18 Drawing Sheets

OTHER PUBLICATIONS

Motorola, "Issues of non-overlapping DL reference signal with power boosting," 3GPP TSG RAN WG1 Meeting #47, R1-063054, Riga, Latvia; Nov. 6-10, 2006, 4 pages.

Nortel, "Discussion on DL power allocation for reference signal and SCH/P-BCH," 3GPP TSG-RAN WG1 #48bis, R1-071451, St. Julian's, Malta; Mar. 26-30, 2007, 6 pages.

Samsung, "Power Scaling and DL RS boosting in a Multi-antenna System," 3GPP TSG RAN WG1 Meeting #50, R1-073557, Athens, Greece; Aug. 20-24, 2007, 7 pages.

3GPP TR 25.814 V7.0.0, Jun. 2006, "Physical layer aspects for evolved Universal Terrestrial Radio Accss (UTRA)," 126 pages.

3GPP TS 36.211 V0.3.1, Feb. 2007, "Physical Channels and Modulation," 28 pages.

International Search Report issued in PCT/JP2008/052742, mailed on May 27, 2008, with translation, 9 pages.

Written Opinion issued in PCT/JP2008/052742, mailed on May 27, 2008, 5 pages.

* cited by examiner

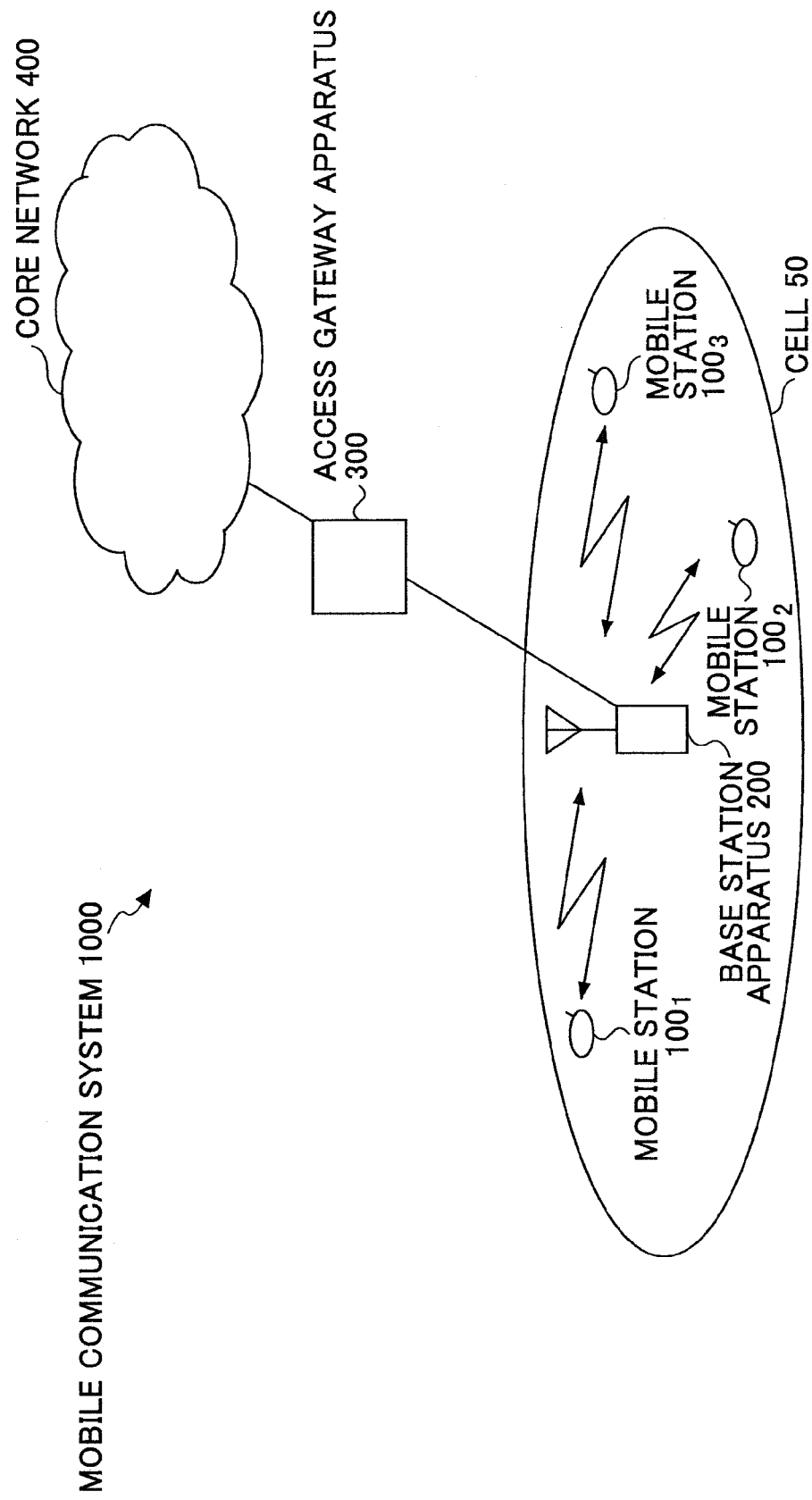

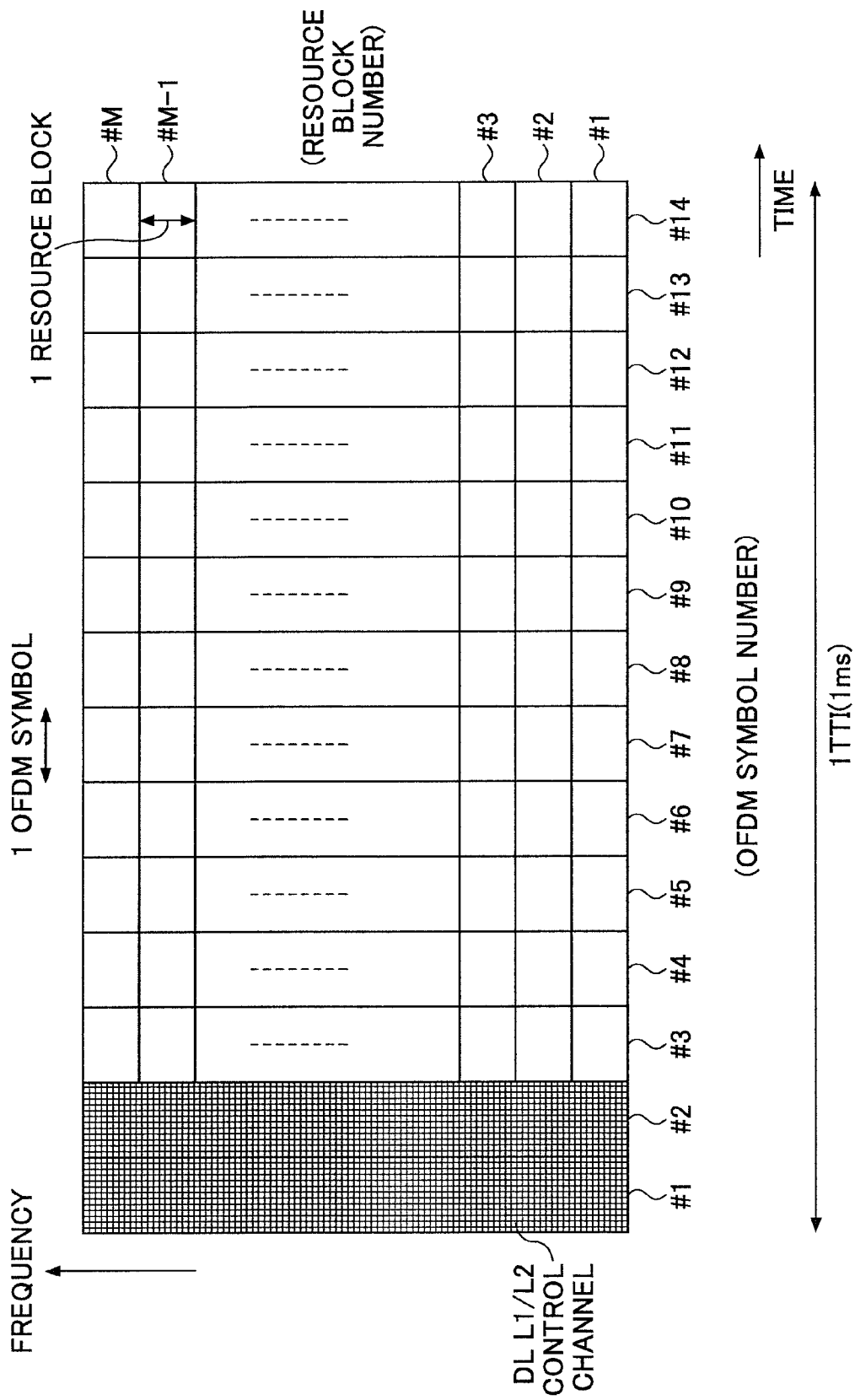

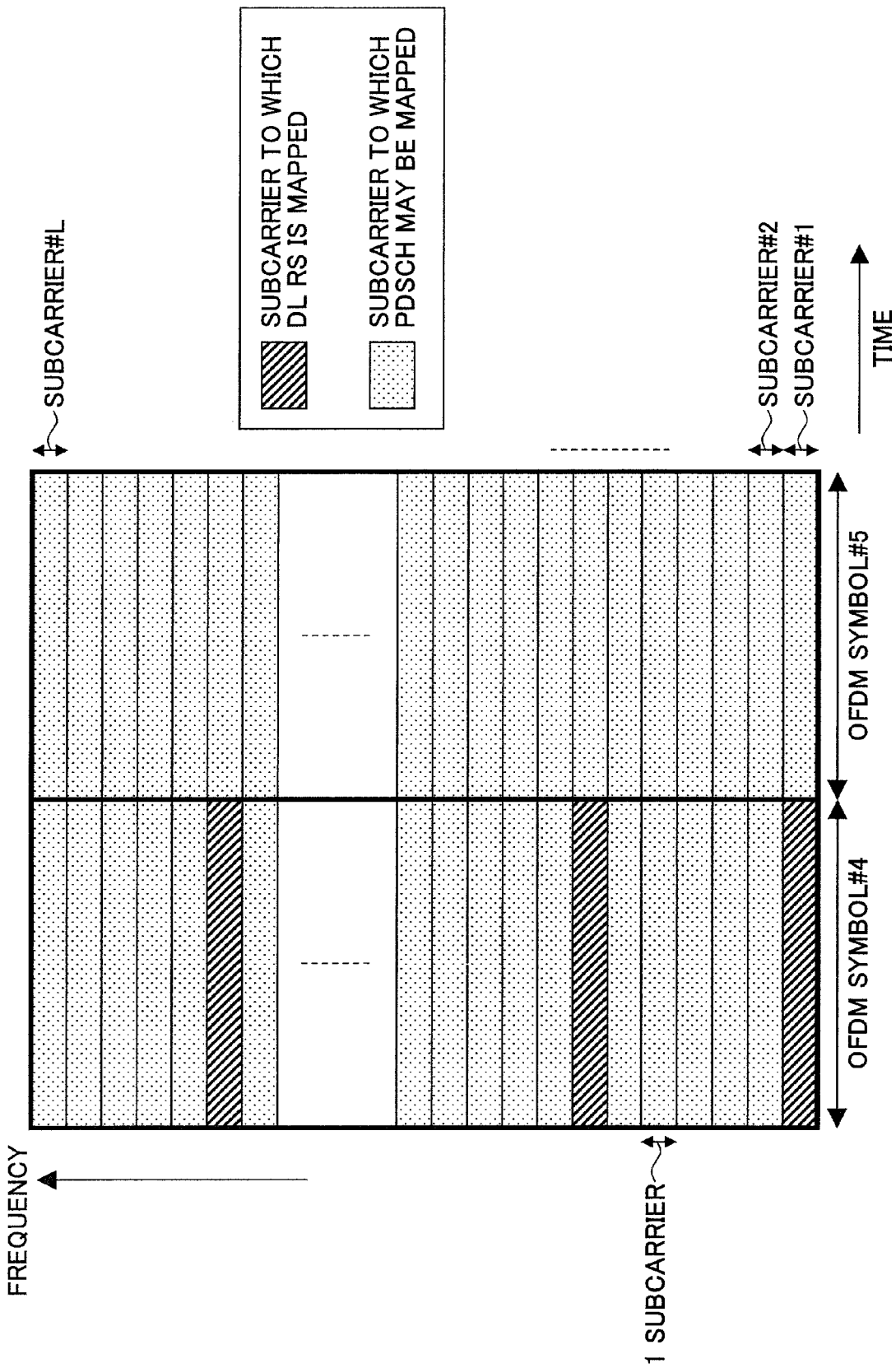

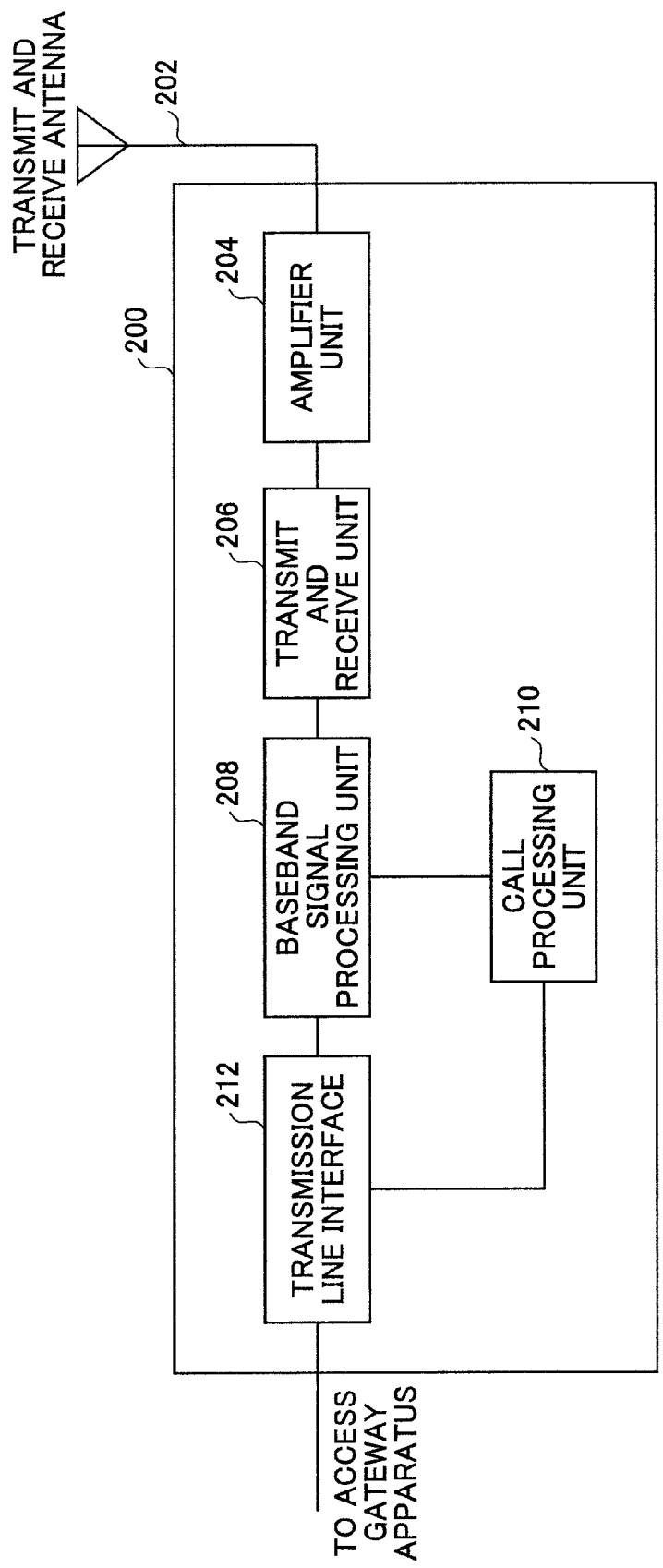

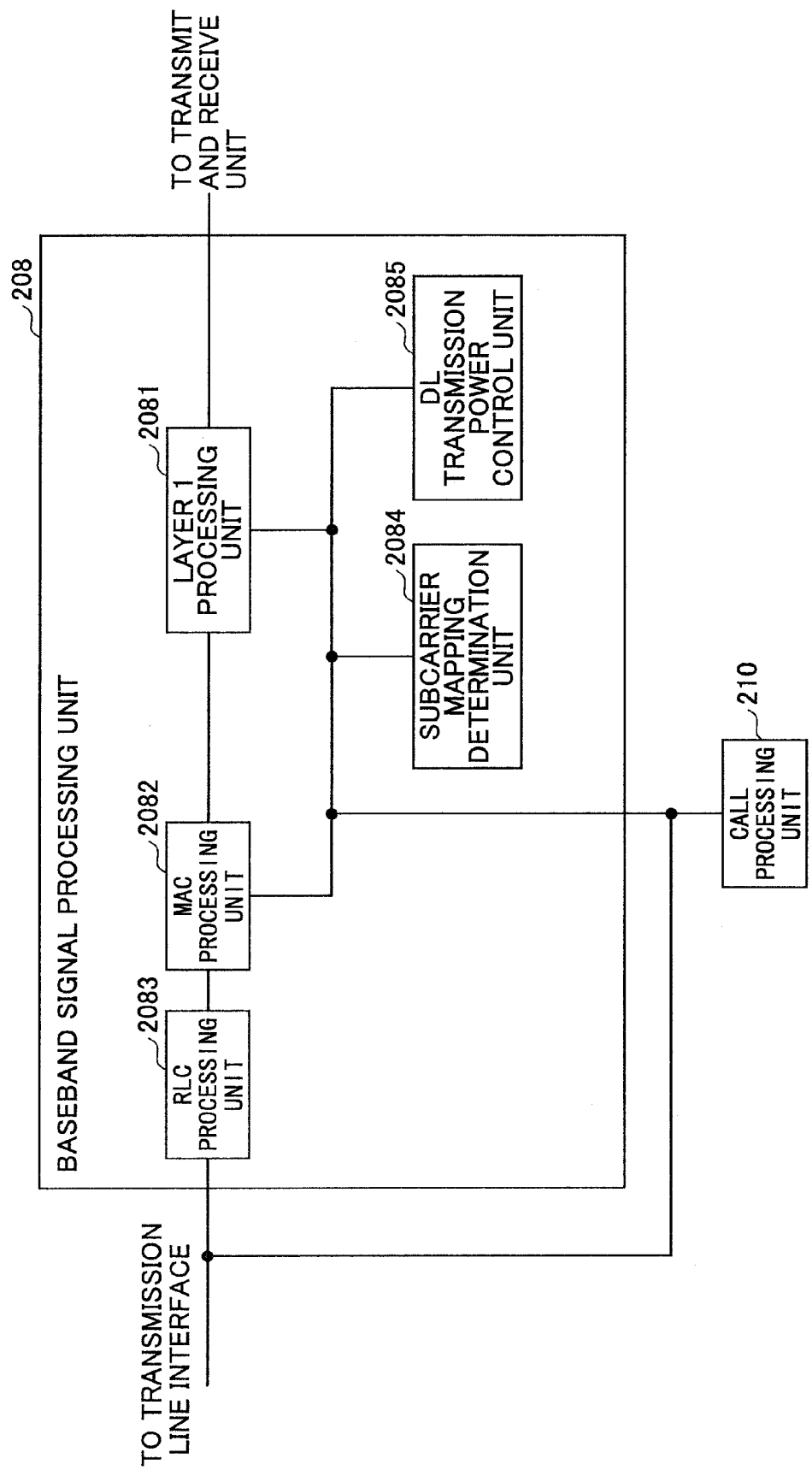

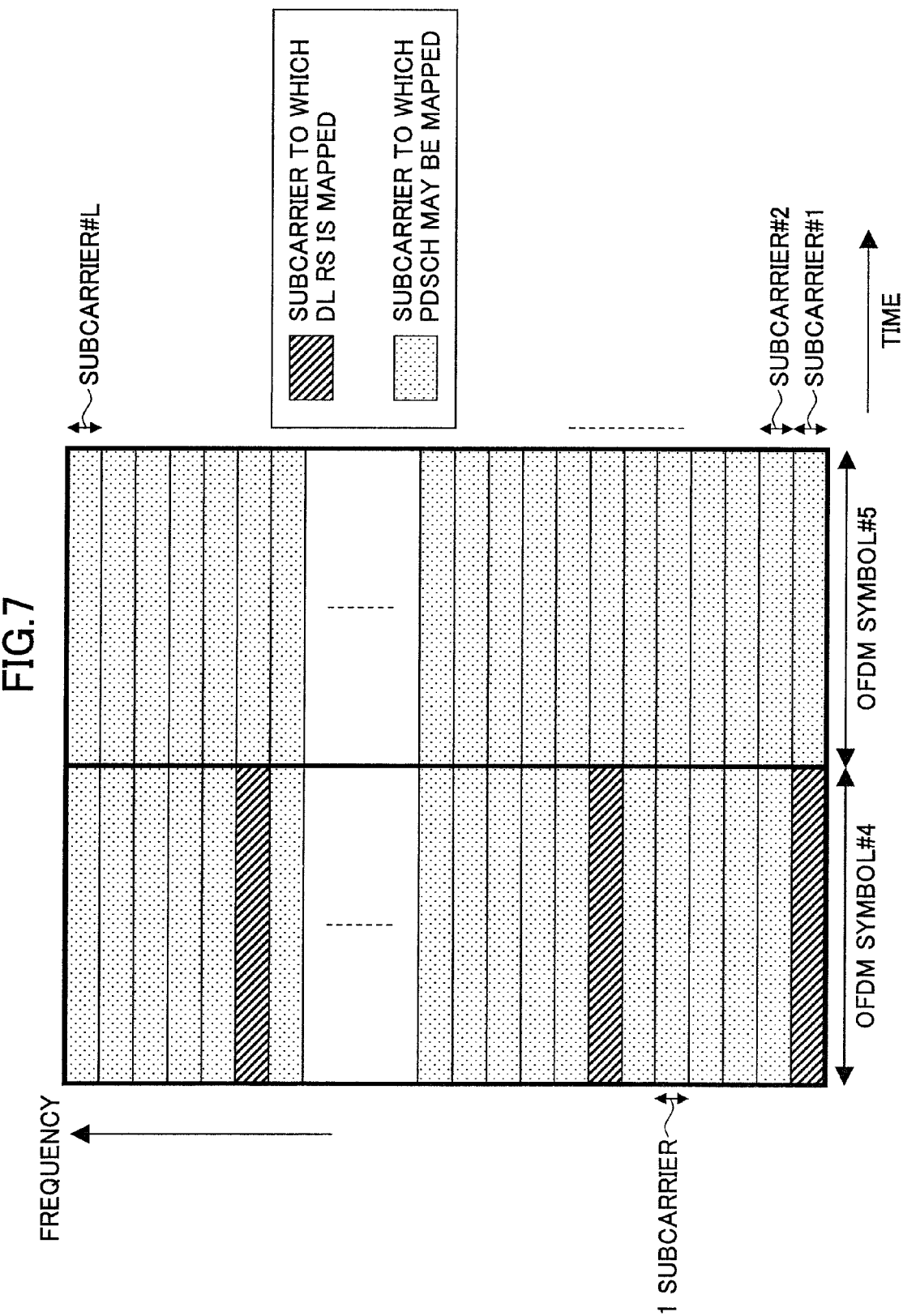

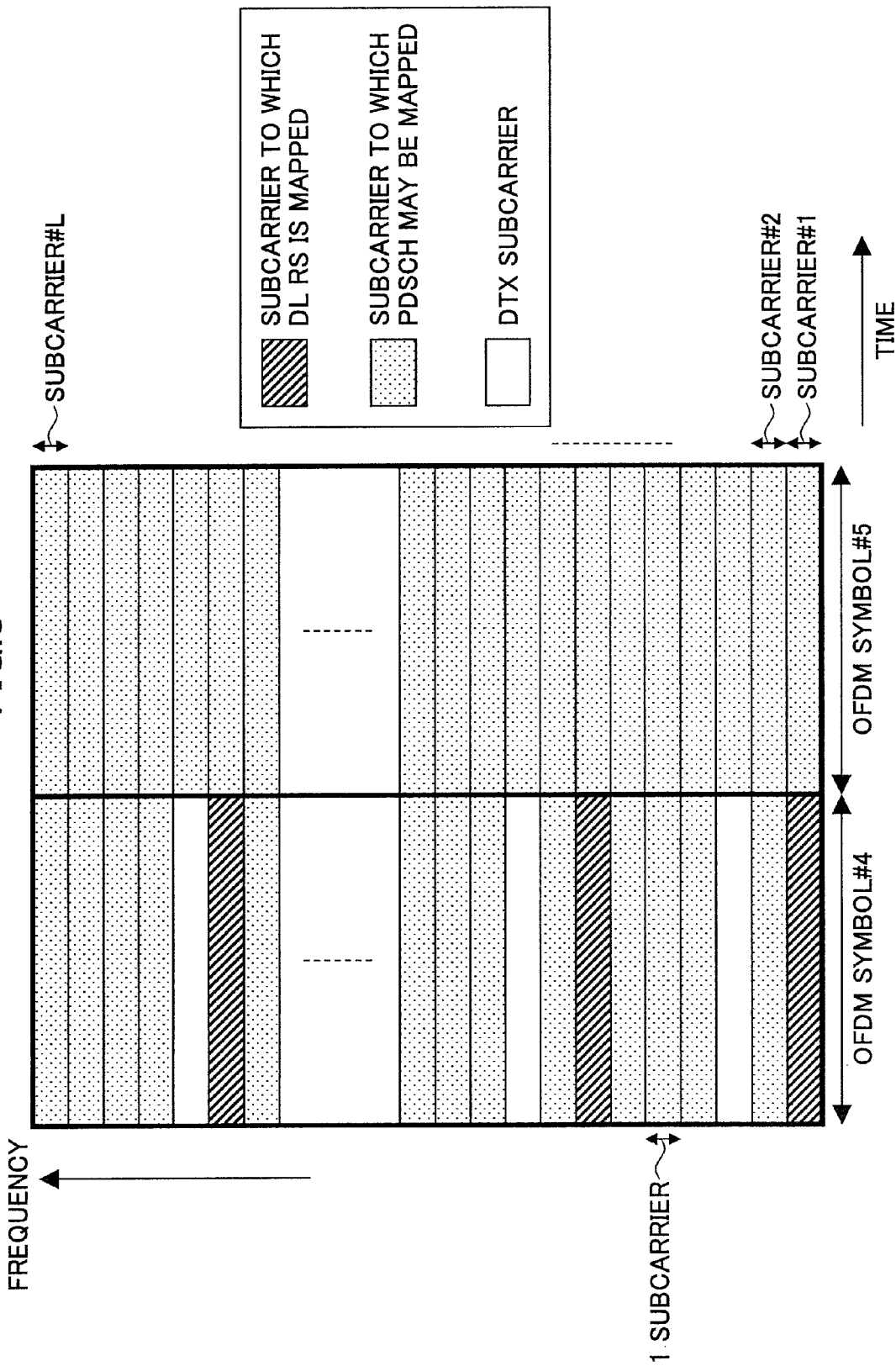

FIG.9A

| NUMBER OF PUNCTURING SUBCARRIERS PER 1 RESOURCE BLOCK | PUNCTURING SUBCARRIER NUMBER |
|---|---|
| 1 | $(X+1)$ mod 12 |
| 2 | $(X+1)$ mod 12, $(X+7)$ mod 12 |
| 3 | $(X+1)$ mod 12, $(X+5)$ mod 12, $(X+9)$ mod 12 |
| 4 | $(X+1)$ mod 12, $(X+4)$ mod 12, $(X+7)$ mod 12, $(X+10)$ mod 12 |
| 5 | $(X+1)$ mod 12, $(X+3)$ mod 12, $(X+5)$ mod 12, $(X+7)$ mod 12, $(X+9)$ mod 12 |
| 6 | $(X+1)$ mod 12, $(X+3)$ mod 12, $(X+5)$ mod 12, $(X+7)$ mod 12, $(X+9)$ mod 12, $(X+11)$ mod 12 |

FIG.9B

| NUMBER OF PUNCTURING SUBCARRIERS PER 1 RESOURCE BLOCK | PUNCTURING SUBCARRIER NUMBER |
|---|---|
| 1 | (X+3) mod 12 |
| 2 | (X+3) mod 12, (X+9) mod 12 |
| 3 | (X+3) mod 12, (X+9) mod 12, (X+1) mod 12 |
| 4 | (X+3) mod 12, (X+9) mod 12, (X+1) mod 12 , (X+7) mod 12 |
| 5 | (X+3) mode 12, (X+9) mod 12, (X+1) mod 12 , (X+7) mod 12, (X+5) |
| 6 | (X+3) mode 12, (X+9) mod 12, (X+1) mod 12 , (X+7) mod 12, (X+5), (X+11) |

FIG.9C

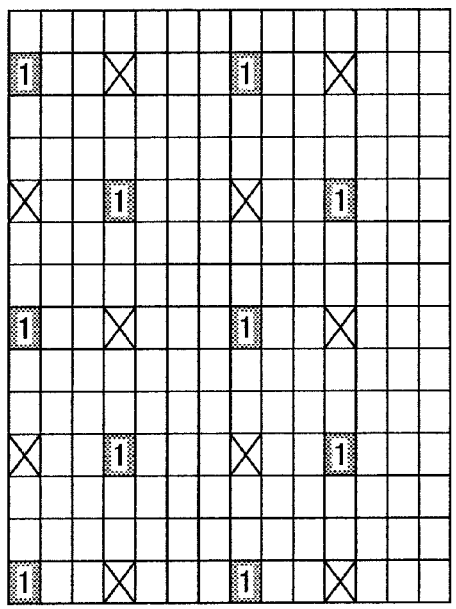
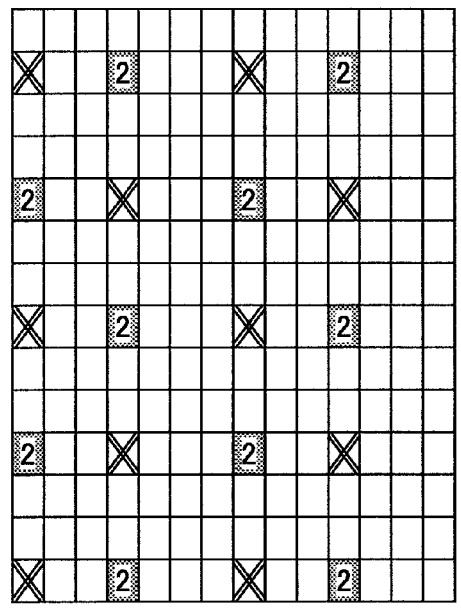

[WHEN ANTENNA PORT NUMBER IS 0 AND $f_{hop}(j)$ IS ALWAYS 0]

[WHEN ANTENNA PORT NUMBER IS 1 AND $f_{hop}(j)$ IS ALWAYS 0]

| 1 | SUBCARRIER OF REFERENCE SIGNAL TRANSMITTED FROM FIRST ANTENNA |
|---|---|
| ⊠ | SUBCARRIER BY WHICH NO SIGNAL IS TRANSMITTED FROM FIRST ANTENNA SINCE THE SUBCARRIER OVERLAPS WITH SUBCARRIER OF REFERENCE SIGNAL TRANSMITTED FROM SECOND ANTENNA |
| 2 | SUBCARRIER OF REFERENCE SIGNAL TRANSMITTED FROM SECOND ANTENNA |
| ⊠ | SUBCARRIER BY WHICH NO SIGNAL IS TRANSMITTED FROM SECOND ANTENNA SINCE THE SUBCARRIER OVERLAPS WITH SUBCARRIER OF REFERENCE SIGNAL TRANSMITTED FROM FIRST ANTENNA |

FIG.10

| | TRANSMISSION POWER VALUE (OFFSET VALUE) | | | | | | |
|---|---|---|---|---|---|---|---|
| | −6~0 dB | 1 dB | 2 dB | 3 dB | 4 dB | 5 dB | 6 dB |
| RB NUMBERS IN WHICH THE NUMBER OF PUNCTURING SUBCARRIERS IN 1 RB IS 0 | ALL RB NUMBERS | RB NUMBERS OTHER THAN THOSE BELOW | NONE | NONE | NONE | NONE | NONE |
| RB NUMBERS IN WHICH THE NUMBER OF PUNCTURING SUBCARRIERS IN 1 RB IS 1 | NONE | EVEN RB NUMBERS | RB NUMBERS OTHER THAN THOSE BELOW | NONE | NONE | NONE | NONE |
| RB NUMBERS IN WHICH THE NUMBER OF PUNCTURING SUBCARRIERS IN 1 RB IS 2 | NONE | NONE | RB NUMBERS OF 5×n−2 (n : NATURAL NUMBER) | ALL RB NUMBERS | NONE | NONE | NONE |
| RB NUMBERS IN WHICH THE NUMBER OF PUNCTURING SUBCARRIERS IN 1 RB IS 3 | NONE | NONE | NONE | NONE | RB NUMBERS OTHER THAN THOSE BELOW | NONE | NONE |
| RB NUMBERS IN WHICH THE NUMBER OF PUNCTURING SUBCARRIERS IN 1 RB IS 4 | NONE | NONE | NONE | NONE | RB NUMBER 13 | RB NUMBERS OTHER THAN THOSE BELOW | NONE |
| RB NUMBERS IN WHICH THE NUMBER OF PUNCTURING SUBCARRIERS IN 1 RB IS 5 | NONE | NONE | NONE | NONE | NONE | RB NUMBERS OF 3×n−3 (n : NATURAL NUMBER) | NONE |
| RB NUMBERS IN WHICH THE NUMBER OF PUNCTURING SUBCARRIERS IN 1 RB IS 6 | NONE | NONE | NONE | NONE | NONE | NONE | ALL RB NUMBERS |

FIG.11

| | TRANSMISSION POWER VALUE (OFFSET VALUE) | | | | | | |
|---|---|---|---|---|---|---|---|
| | -6~0 dB | 1 dB | 2 dB | 3 dB | 4 dB | 5 dB | 6 dB |
| RB NUMBERS IN WHICH THE NUMBER OF PUNCTURING SUBCARRIERS IN 1 RB IS 0 | ALL RB NUMBERS | RB NUMBERS OTHER THAN THOSE BELOW | NONE | NONE | NONE | NONE | NONE |
| RB NUMBERS IN WHICH THE NUMBER OF PUNCTURING SUBCARRIERS IN 1 RB IS 1 | NONE | EVEN RB NUMBERS AND RB NUMBER 49 | RB NUMBERS OTHER THAN THOSE BELOW | NONE | NONE | NONE | NONE |
| RB NUMBERS IN WHICH THE NUMBER OF PUNCTURING SUBCARRIERS IN 1 RB IS 2 | NONE | NONE | RB NUMBERS OF 5×n-2 (n : NATURAL NUMBER) | ALL RB NUMBERS | NONE | NONE | NONE |
| RB NUMBERS IN WHICH THE NUMBER OF PUNCTURING SUBCARRIERS IN 1 RB IS 3 | NONE | NONE | NONE | NONE | RB NUMBERS OTHER THAN THOSE BELOW | NONE | NONE |
| RB NUMBERS IN WHICH THE NUMBER OF PUNCTURING SUBCARRIERS IN 1 RB IS 4 | NONE | NONE | NONE | NONE | RB NUMBER 13, 38 | RB NUMBERS OTHER THAN THOSE BELOW | NONE |
| RB NUMBERS IN WHICH THE NUMBER OF PUNCTURING SUBCARRIERS IN 1 RB IS 5 | NONE | NONE | NONE | NONE | NONE | RB NUMBERS OF 3×n-3 (n : NATURAL NUMBER) AND RB NUMBER 49 | NONE |
| RB NUMBERS IN WHICH THE NUMBER OF PUNCTURING SUBCARRIERS IN 1 RB IS 6 | NONE | NONE | NONE | NONE | NONE | NONE | ALL RB NUMBERS |

FIG.12A

| | TRANSMISSION POWER VALUE (OFFSET VALUE) | | | | | | |
|---|---|---|---|---|---|---|---|
| | −6~0 dB | 1 dB | 2 dB | 3 dB | 4 dB | 5 dB | 6 dB |
| RB NUMBERS IN WHICH THE NUMBER OF PUNCTURING SUBCARRIERS IN 1 RB IS 0 | ALL RB NUMBERS | RB NUMBERS OTHER THAN THOSE BELOW | NONE | NONE | NONE | NONE | NONE |
| RB NUMBERS IN WHICH THE NUMBER OF PUNCTURING SUBCARRIERS IN 1 RB IS 1 | NONE | EVEN RB NUMBERS AND RB NUMBERS 49 AND 99 | RB NUMBERS OTHER THAN THOSE BELOW | NONE | NONE | NONE | NONE |
| RB NUMBERS IN WHICH THE NUMBER OF PUNCTURING SUBCARRIERS IN 1 RB IS 2 | NONE | NONE | RB NUMBERS OF 5×n−2 (n: NATURAL NUMBER) | ALL RB NUMBERS | NONE | NONE | NONE |
| RB NUMBERS IN WHICH THE NUMBER OF PUNCTURING SUBCARRIERS IN 1 RB IS 3 | NONE | NONE | NONE | NONE | RB NUMBERS OTHER THAN THOSE BELOW | NONE | NONE |
| RB NUMBERS IN WHICH THE NUMBER OF PUNCTURING SUBCARRIERS IN 1 RB IS 4 | NONE | NONE | NONE | NONE | RB NUMBER 13, 38, 63 AND 88 | RB NUMBERS OTHER THAN THOSE BELOW | NONE |
| RB NUMBERS IN WHICH THE NUMBER OF PUNCTURING SUBCARRIERS IN 1 RB IS 5 | NONE | NONE | NONE | NONE | NONE | RB NUMBERS OF 3×n−3 (n: NATURAL NUMBER) AND RB NUMBERS 49 AND 98 | NONE |
| RB NUMBERS IN WHICH THE NUMBER OF PUNCTURING SUBCARRIERS IN 1 RB IS 6 | NONE | NONE | NONE | NONE | NONE | NONE | ALL RB NUMBERS |

FIG.12B

| NUMBER OF PUNCTURING SUBCARRIERS IN EACH RB | TRANSMISSION POWER VALUE (OFFSET VALUE) OF DL RS (DOWNLINK REFERENCE SIGNAL) |
|---|---|
| 0 | 0.00 dB |
| 1 | 1.76 dB |
| 2 | 3.01 dB |
| 3 | 3.97 dB |
| 4 | 4.77 dB |
| 5 | 5.44 dB |
| 6 | 6.02 dB |

MAINTAINING A CONSTANT TRANSMISSION POWER DENSITY OF A DATA SIGNAL UTILIZING PROHIBITED SUBCARRIERS

TECHNICAL FIELD

The present invention relates to a mobile communication system to which orthogonal frequency division multiplexing (OFDM) is applied in downlink. More particularly, the present invention relates to a base station apparatus and a communication control method.

BACKGROUND ART

3GPP that is a standardization group of W-CDMA is studying a communication scheme that becomes a successor to W-CDMA and HSDPA, that is, 3GPP is studying Long Term Evolution (LTE). As radio access schemes, OFDM (Orthogonal Frequency Division Multiplexing) is being studied for downlink, and SC-FDMA (Single-Carrier Frequency Division Multiple Access) is being studied for uplink (refer to non-patent document 1, for example).

OFDM is a scheme for dividing a frequency band into a plurality of narrow frequency bands (subcarriers) so as to perform transmission by carrying data on each subcarrier. By arranging the subcarriers on frequencies densely without interfering with each other while a part of them overlap, high speed transmission is realized so that efficiency of use of frequency increases.

SC-FDMA is a transmission scheme that can decrease interference among terminals by dividing frequency band and performing transmission using frequency bands that are different among a plurality of terminals. Since the SC-FDMA has characteristics that variation of transmission power becomes small, low power consumption in the terminal and wide coverage can be realized.

Generally, in mobile communications, pilot signals are used for channel estimation and radio quality measurement. The pilot signal is called Downlink Reference Signal (DL RS) in LTE.

The downlink reference signal in LTE is represented as a two dimensional sequence, and is formed by a two dimensional orthogonal sequence and a two dimensional pseudo random sequence. Mapping (subcarrier number) of the reference signal to physical resources can be represented by the following equation (non patent document 2):

$$k = 6m + (v + f_{hop}(\lfloor i/2 \rfloor)) \bmod 6$$

$$l = \begin{cases} 0 & n = 0 \\ N_{symb}^{DL} - 3 & n = 1 \end{cases}$$

wherein k indicates a subcarrier number, l indicates an OFDM symbol number, and i indicates a slot number, and m is an integer value as follows.

$$m = 0, 1, \ldots, \left\lfloor \frac{N_{BW}^{DL}}{N_{BW}^{RB}/2} \right\rfloor$$

$$n = \begin{cases} 0, 1 & \text{for } p = 0, 1 \\ 0 & \text{for } p = 2, 3 \text{ and the generic frame structure} \\ 0, 1 & \text{for } p = 2, 3 \text{ and the alternative frame structure} \end{cases}$$

$$N_{BW}^{RB} = 12, N_{symb}^{DL} = 7$$

$N_{BW}^{DL}$ indicates the number of subcarriers in the whole system band. $N_{BW}^{DL}$ is 300 when the system bandwidth is 5 MHz, is 600 when the system bandwidth is 10 MHz, and is 1200 when the system bandwidth is 20 MHz. P indicates an antenna port number. When only one antenna is used, p=0. When four antennas can be used, p=0, 1, 2 or 3.

In the above-mentioned equation, v is determined by the following equation.

$$v = \begin{cases} 3n & \text{for } p = 0 \\ 3 + 3n & \text{for } p = 1 \\ 1 + 3(i \bmod 2) & \text{for } p = 2 \\ 2 + 3(i \bmod 2) & \text{for } p = 3 \end{cases}$$

In the before-mentioned equation, $f_{hop}(j)$ is a cell-specific integer sequence indicating a hopping pattern which changes for each subframe or each slot of the downlink reference signal. That is, by changing $f_{hop}(j)$ for each cell, it becomes possible to map the downlink reference signal to a subcarrier which is different for each cell.

The value $f_{hop}(j)$ may be a fixed value independent of time. When such a fixed value is set to each cell, the downlink reference signal is mapped while being shifted by the fixed value which is different for each cell.

FIG. 1 shows a mapping example of the reference signal. FIG. 1 shows mapping (left side) to physical resources when the antenna port number is 0 (p=0) and $f_{hop}(j)$ is always 0, and shows mapping (right side) to physical resources when the antenna port number is 0 (p=0) and $f_{hop}(j)$ is always 2.

As shown in the figure, in the former case, the downlink reference signal is mapped to k-th (k=6×j (j is an integer equal to or greater than 0)) subcarrier in the first OFDM symbol (l=0). However, in the latter case, the downlink reference signal is mapped to k-th (k=6×j+2 (j is an integer equal to or greater than 0)) subcarrier in the first OFDM symbol (l=0). Accordingly, the downlink reference signal in LTE is mapped to subcarriers which are different for each cell by properly setting $f_{hop}(j)$.

By the way, it is being studied that the user apparatus performs demodulation of 16 QAM and 64 QAM by using information of a fixed value which is a ratio between transmission power per one subcarrier (transmission power density per unit frequency) of the downlink reference signal and transmission power per one subcarrier (transmission power density per unit frequency) of normal data signal (refer to non-patent document 3, for example). The normal data signal is, as a physical channel, the physical downlink shared channel (PDSCH). It is necessary to perform amplitude estimation for demodulation of 16 QAM and 64 QAM. It can be expected to improve estimation accuracy by performing demodulation by using the knowledge that power density difference between the reference signal and the data signal is a fixed value. In this case, since transmission power per one subcarrier of the downlink reference signal is always constant, transmission power per one subcarrier of the normal data signal is also always constant.

Since the downlink reference signal is not transmitted in all OFDM symbols, there is a time range in which the downlink reference signal is transmitted and a time range in which the downlink reference signal is not transmitted. Therefore, if total transmission power of the base station is set to be constant, transmission power density of the data signal may vary for each OFDM symbol. Then, there is fear that the amplitude estimation accuracy is susceptible to deterioration. Methods are proposed for setting transmission power of normal data signal to be constant in the both time ranges regardless of whether the reference signal is included in the OFDM symbol.

In one of the methods, the normal data signal is prohibited from being mapped to a predetermined subcarrier in a time range in which the downlink reference signal is transmitted. Any data is not mapped to the predetermined subcarrier. By reducing subcarriers where the data signal can be mapped, transmission power density of the data signal can be increased by that. Thus, transmission power density of the data signal can be kept constant regardless of whether the reference signal is transmitted. This technique is described in the non-patent document 3, for example.

[Non-patent document 1] 3GPP TR 25.814 (V7.0.0), "Physical Layer Aspects for Evolved UTRA," June 2006
[Non-patent document 2] 3GPP TR 36.211 (V0.3.1), "Physical Channels and Modulation," November 2006
[Non-patent document 3] R1-070088, Power Boosting of Reference Signal in E-UTRA Downlink

DISCLOSURE OF THE INVENTION

Problem to be Solved by the Invention

As mentioned above, the reference signal is mapped to a specific subcarrier in a specific OFDM symbol. Since channel estimation in the reception side (user apparatus, typically) is based on the reference signal, the mapping position has large effects on channel estimation accuracy. Therefore, it is necessary to properly set the position of the subcarrier (prohibited subcarrier) to which mapping of the data signal is prohibited in response to shift of mapping position of the reference signal in frequency direction and in response to hopping of the reference signal in time axis direction. However, such a mapping method is not adequately studied currently.

An object of the present invention is to provide a base station, a user apparatus and a method used for them for properly placing prohibited subcarriers such that transmission power density of the data signal becomes constant in terms of time, in a next generation mobile communication system in which mapping position of the reference signal changes in frequency direction and in time direction.

Means for Solving the Problem

A base station apparatus used in the present invention is used in a mobile communication system that uses an OFDM scheme in a downlink. The base station apparatus includes: a unit configured to perform inverse Fourier transform on a signal in which a first signal and a second signal is mapped to subcarriers with different transmission power density, and to generate a transmission signal; and a transmission unit configured to transmit the transmission signal to a user apparatus. A subcarrier (prohibited subcarrier) in which mapping of the second signal is prohibited is determined such that transmission power density of the second signal is kept constant among a plurality of OFDM symbols regardless of whether the first signal is included in an OFDM symbol including the second signal. The prohibited subcarrier is determined based on a subcarrier to which the first signal is mapped.

Effect of the Invention

According to the present invention, prohibited subcarriers can be properly arranged such that transmission power density of non-reference signals (typically, data signal) becomes temporally constant, in a next generation mobile communication system in which mapping positions of the reference signal changes in the frequency direction and the time direction.

BRIEF DESCRIPTION OF THE DRAWINGS

FIG. 2 is a block diagram showing a configuration of a mobile communication system according to an embodiment of the present invention;

FIG. 3 is a schematic diagram showing a configuration of a subframe;

FIG. 4 is a diagram showing a mapping example of subcarriers for two OFDM symbols;

FIG. 5 is a partial block diagram showing a base station apparatus according to an embodiment of the present invention;

FIG. 6A is a block diagram showing a baseband signal processing unit of the base station apparatus according to an embodiment of the present invention;

FIG. 7 is a diagram showing a mapping example of subcarriers in the case when transmission power density of the downlink reference signal is the same as transmission power density of PDSCH;

FIG. 8 is a diagram showing a mapping example of subcarriers in the case when transmission power density of the downlink reference signal is greater than transmission power density of PDSCH, and is a diagram showing a mapping example of subcarriers for an OFDM symbol;

FIG. 9A is a diagram showing correspondence relationship between the number of puncturing subcarriers and their subcarrier numbers;

FIG. 9B is a diagram showing correspondence relationship between the number of puncturing subcarriers and their subcarrier numbers;

FIG. 9C is a diagram showing a mapping example of the downlink reference signal;

FIG. 10 is a diagram showing correspondence relationship between offset power between the reference signal and other signal, and the number of puncturing subcarriers (when the system bandwidth is 5 MHz);

FIG. 11 is a diagram showing correspondence relationship between offset power between the reference signal and other signal, and the number of puncturing subcarriers (when the system bandwidth is 10 MHz);

FIG. 12A is a diagram showing correspondence relationship between offset power between the reference signal and other signal, and the number of puncturing subcarriers (when the system bandwidth is 20 MHz);

FIG. 12B is a diagram showing correspondence relationship between the number of puncturing subcarriers and transmission power value (offset value) of the reference signal;

Figure 1:
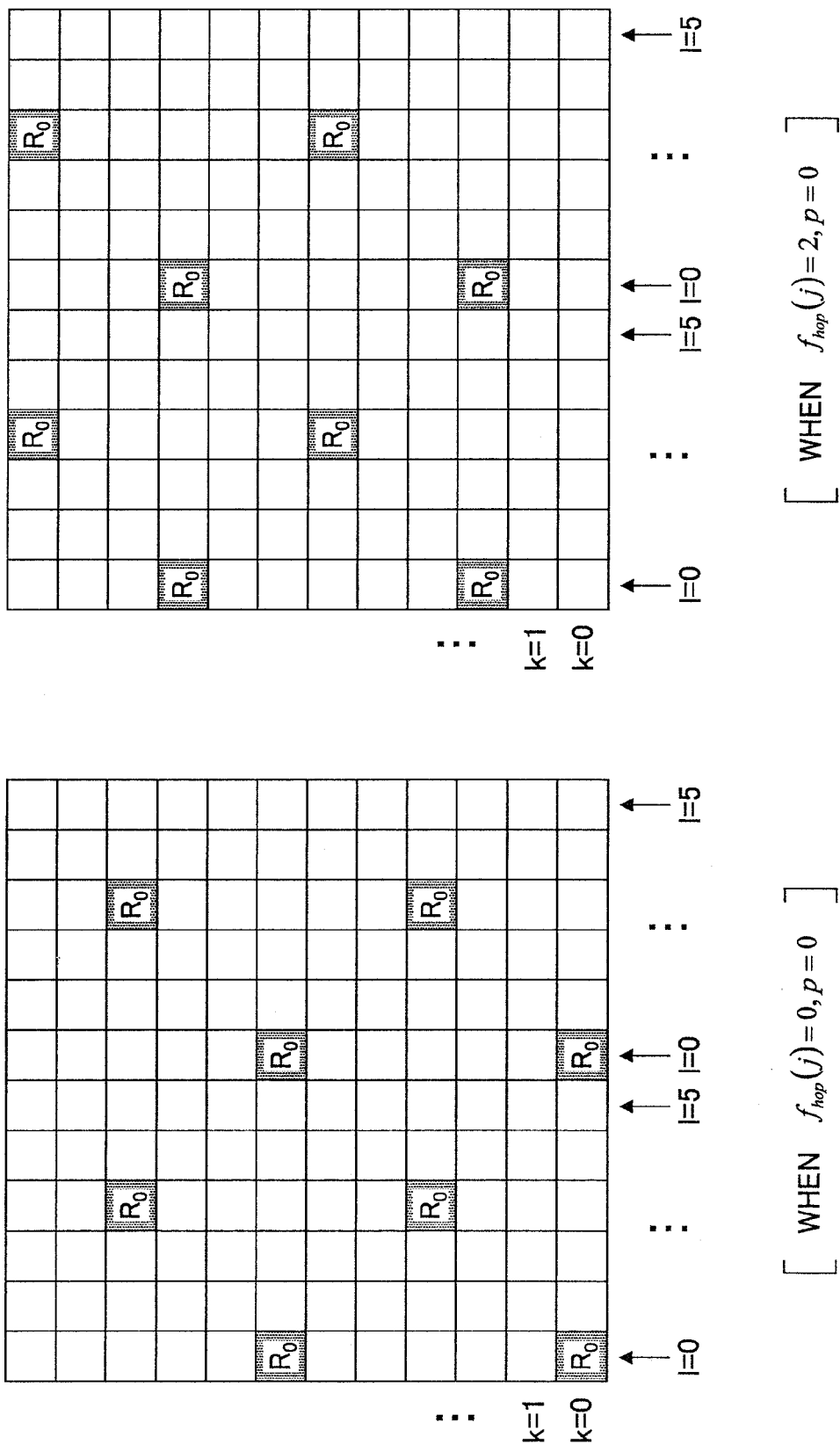
FIG. 1 is a diagram showing a mapping example of the downlink reference signal.

DESCRIPTION OF REFERENCE SIGNS 50 cell
$100_1, 100_2, 100_3, 100_n$ user apparatus 102 transmit and receive antenna
104 amplifying unit
106 transmit and receive unit
108 baseband signal processing unit
110 call processing unit
112 application unit
200 base station apparatus
202 transmit and receive antenna
204 amplifying unit
206 transmit and receive unit
208 baseband signal processing unit
210 call processing unit
212 transmission line interface
2081 layer 1 processing unit
2082 MAC processing unit
2083 RLC processing unit
2084 subcarrier mapping determination unit
2085 DL transmission power control unit
300 access gateway apparatus
400 core network

PREFERRED EMBODIMENTS FOR CARRYING OUT THE INVENTION

Next, preferred embodiments for carrying out the present invention are described with reference to figures based on the following embodiments. In all of the figures for explaining embodiments, the same reference symbols are used for parts having the same function, and repeated descriptions are not given.

A mobile communication system to which the base station apparatus of an embodiment of the present invention is applied is described with reference to FIG. 2.

The radio communication system 1000 is a system to which Evoled UTRA and UTRAN (Another name: Long Term Evolution, or Super 3G) is applied, for example. The radio communication system 1000 includes a base station apparatus (eNB: eNode B) 200 and a plurality of user apparatuses (UE: User Equipment) $100_n$ ($100_1$, $100_2$, $100_3$, ... $100_n$, n is an integer and n>0). The base station apparatus 200 is connected to an upper station, that is, an access gateway apparatus 300, for example, and the access gateway apparatus 300 is connected to a core network 400. The user apparatus $100_n$ is communicating with the base station apparatus 200 by Evolved UTRA and UTRAN in a cell 50.

In the following, since the user apparatuses ($100_1$, $100_2$, $100_3$, ... $100_n$) have the same configurations, functions and states, a user apparatus $100_n$ is described unless otherwise mentioned. For the sake of convenience of explanation, although the entity which communicates with the base station apparatus by radio is the user apparatus, it includes a mobile terminal and a fixed terminal more generally.

The mobile communication system 1000 can operate with a plurality of variable bandwidths. As an example, 5 MHz, 10 MHz and 20 MHz are prepared as the variable bandwidths. An operator can operate one or more bandwidths of the variable bandwidths as system band, and in the system, a user can perform communication using one or more resource blocks (25 resource blocks are prepared in the 5 MHz system band, for example).

In the following, since the user apparatuses $100_n$ ($100_1$, $100_2$, $100_3$, ... $100_n$) have the same configurations, functions and states, a user apparatus $100_n$ is described unless otherwise mentioned.

As radio access schemes, the radio communication system 1000 uses OFDM (orthogonal frequency division multiplexing) in downlink, and uses SC-FDMA (single carrier-frequency division multiple access) in uplink. As mentioned above, OFDM is a scheme in which a frequency band is divided into a plurality of narrow frequency bands (subcarriers) so that transmission is performed by carrying data on each frequency band. SC-FDMA is a transmission scheme that can decrease interference among terminals by dividing a frequency band and by transmitting signals using different frequency bands among a plurality of terminals.

As mentioned above, in the downlink, a physical downlink shared channel (PDSCH) that is shared and used by each user apparatus $100_n$, and a downlink control channel for LTE are used. The downlink control channel for LTE is called physical downlink control channel (PDCCH). The physical downlink control channel is also called downlink (DL) L1/L2 control channel.

In the uplink, a physical uplink shared channel (PUSCH) that is shared and used by each user apparatus $100_n$ and a control channel for LTE are used. There are two types of uplink control channels, which are a channel that is time-division multiplexed to the physical uplink shared channel and a channel that is frequency-multiplexed to the physical uplink shared channel. The latter is transmitted by a band specifically prepared separately from the physical uplink shared channel.

In the uplink, the uplink control channel for LTE transmits downlink quality information (CQI: Channel Quality Indicator) and acknowledgement information (HARQ ACK information) for the physical downlink shared channel (Downlink Shared Channel (DL-SCH) as transport channel). The downlink quality information (CQI) is also used for resource assignment (scheduling) of the physical downlink shared channel, and for determining transport format in adaptive modulation and coding (AMC).

As shown in FIG. 3 as an example, one subframe is 1 ms, for example, and one subframe includes 14 OFDM symbols, for example. The physical downlink control channel is mapped to some OFDM symbols from the top of the one subframe. The maximum number of the OFDM symbols to which the physical downlink control channel is mapped is 3. There are three kinds of methods for mapping the physical downlink control channel, which are mapping to an OFDM symbol #1, mapping to OFDM symbols #1 and #2, and mapping to OFDM symbols #1, #2 and #3. In FIG. 3, the physical downlink control channel is mapped to two OFDM symbols (#1, #2) of the top of the one subframe. Then, in OFDM symbols to which the physical downlink control channel is not mapped, a data signal (physical downlink shared channel PDSCH as a physical channel, DL-SCH as a transport channel), a synchronization channel (SCH or synchronization signal), a broadcast channel (BCH) or the like is transmitted. In the frequency direction, M resource blocks (RB) are prepared. As an example, the frequency band per one resource block is 180 kHz, and there are 12 subcarriers in one resource block. For the sake of convenience of explanation, a resource occupying a band of one subcarrier and a period of one OFDM symbol is called "resource element". The number M of the resource blocks is 25 when the system bandwidth is 5 MHz, is 50 when the system bandwidth is 10 MHz, and is 100 when the system bandwidth is 20 MHz.

FIG. 4 shows a subcarrier mapping example as to OFDM symbols #4 and #5 in the case of the subframe configuration shown in FIG. 3. In FIG. 4, the total number of subcarriers in one OFDM symbol is L, and the subcarriers are numbered in ascending frequency order as subcarriers #1, #2, ... , and #L. When the system bandwidth is 5 MHz, L=300, when the system bandwidth is 10 MHz, L=600, and when the system bandwidth is 20 MHz, L=1200. As shown in the figure, the downlink reference signal (DL RS) and the physical downlink shared channel (PDSCH) are mapped to subcarriers in the OFDM symbol #4. The DL RS is transmitted at a rate of one per six subcarriers. In FIG. 4, the DL RS is mapped to subcarriers of subcarrier numbers of 6×m+1 (m: 0, 1, 2, . . . ).

Next, an outline of information items that may be included in the physical downlink control channel is described. The physical downlink control channel may include physical downlink control channel format indicator, control information for downlink communication which is downlink scheduling information, and/or control information for uplink communication. The physical downlink control channel format indicator indicates that the number of symbols occupied by the physical downlink control channel in one subframe. The physical downlink control channel format indicator may be called Physical Control Format Indicator Channel (PCFICH). The control information for downlink communication, that is, the downlink scheduling information may include downlink resource assignment information, downlink MIMO information, transmission format information, retransmission control information and user identification information.

The control information for downlink communication may be called Downlink Scheduling Grant or Downlink Assignment Information. The downlink resource assignment information represents which resource block is used for transmission of a downlink data signal. The downlink MIMO information includes information relating to the number of streams, precoding vector and the like when multiple-input multiple-output communication or multi-antenna communication is performed. The transmission format information specifies a combination of data modulation scheme, data size and channel coding scheme. The retransmission control information (HARQ: Hybrid Automatic Repeat reQuest) indicates information when hybrid ARQ is performed. The retransmission control information may include process number, new data indicator, and the number of times of retransmission sequence.

Control information for uplink communication may include uplink resource assignment information, transmission format information, demodulation reference signal information, transmission power control information, user identification information, acknowledgement information (ACK/NACK) for uplink, overload indicator, and transmission power control command bit.

The uplink resource assignment information indicates which resource block is available for uplink data transmission. The transmission format information specifies a combination of data modulation scheme, data size and channel coding scheme used for uplink communication. The information of the demodulation reference signal indicates what signal is used for the reference signal. The transmission power control information indicates how much transmission power of the physical uplink shared channel is different from transmission power of sounding reference signal. The above-mentioned uplink resource assignment information, transmission format information, information of demodulation reference signal and transmission power control information are collectively called Uplink Scheduling Grant.

The acknowledgement information (ACK/NACK) indicates whether data transmitted from the user apparatus in the uplink in the past was properly received by the base station. The transmission confirmation information (ACK/NACK) for uplink may be called Physical Hybrid ARQ Indicator Channel (PHICH). The overload indicator is reported to neighbor cells when other cell interference due to user apparatuses of other cell exceeds a predetermined value. The report is a signal requesting the user apparatus of the other cell to reduce transmission power. The transmission power control command bit indicates that next transmission power of the sounding reference signal periodically transmitted from the user apparatus should be increased or decreased from the current value.

The physical downlink control channel format indicator, acknowledgement information (ACK/NACK) for uplink, and the transmission power control command bit may not be included in the physical downlink control channel, and may be defined as a different physical channel which is parallel to the physical downlink control channel.

The base station apparatus 200 of the embodiment of the present invention is described with reference to FIG. 5.

The base station apparatus 200 of the present embodiment includes a transmit and receive antenna 202, an amplifier unit 204, a transmit and receive unit 206, a baseband signal processing unit 208, a call processing unit 210, and a transmission line interface 212.

Packet data to be transmitted from the base station apparatus 200 to the user apparatus $100_n$ in the downlink is input to the baseband signal processing unit 208 from an upper station placed in the upper layer of the base station apparatus 200, that is, from an access gateway apparatus 300, for example, via the transmission line interface 212.

The baseband signal processing unit 208 performs segmentation processing and concatenation processing for packet data, transmission processing in the RLC layer such as transmission processing of RLC (radio link control) retransmission control, and MAC (Medium Access Control) retransmission control processing, and the like, so that the processed signal is transferred to the transmit and receive unit 206. Processing in the baseband signal processing unit 208 includes transmission processing of HARQ, scheduling, transmission format selection, channel coding, and inverse fast Fourier transform (IFFT) and the like. As mentioned later, the baseband signal processing unit 208 determines the number of OFDM symbols to which the physical downlink control channel is mapped for each subframe, and performs mapping of the physical downlink control channel and the physical downlink shared channel to subcarriers, and performs transmission power control for the physical downlink control channel and the physical downlink shared channel, and the like.

The transmit and receive unit 206 performs frequency conversion processing for converting the baseband signal output from the baseband signal processing unit 208 into a radio frequency signal. After that, the radio frequency signal is amplified by the amplifier unit 204 so that the signal is transmitted by the transmit and receive antenna 202.

On the other hand, as to data to be transmitted from the user apparatus $100n$ to the base station apparatus 200 in the uplink, a radio frequency signal received by the transmit and receive antenna 202 is amplified by the amplification unit 204, and is frequency-converted by the transmit and receive unit 206 so that the signal is converted to a baseband signal, and the baseband signal is input into the baseband signal processing unit 208.

The baseband signal processing unit 208 performs FFT processing, IDFT processing, error correction decoding, reception processing of MAC retransmission control, reception processing of RLC layer for the input baseband signal, so that the processed signal is transferred to the access gateway apparatus 300 via the transmission line interface 212.

The call processing unit 210 performs call processing such as setup or release of a communication channel, management of state of the radio base station 200, and resource assignment.

The configuration of the baseband signal processing unit 208 is described with reference to FIG. 6A.

The baseband signal processing unit 208 includes a layer 1 processing unit 2081, a MAC (Medium Access Control) processing unit 2082, an RLC processing unit 2083, a subcarrier mapping determination unit 2084, and a DL transmission power control unit 2085.

The layer 1 processing unit 2081, the MAC processing unit 2082, the subcarrier mapping determination unit 2084, and the DL transmission power control unit 2085 in the baseband signal processing unit 208, and the call processing unit 210 are connected with each other.

The layer 1 processing unit 2081 performs channel coding and IFFT processing for data transmitted by downlink, and performs channel decoding, IDFT processing and FFT processing and the like for data transmitted by the uplink. The layer 1 processing unit 2081 maps information of the physical downlink control channel and the physical downlink shared channel to subcarriers based on subcarrier information reported from the subcarrier mapping determination unit 2084. In an OFDM symbol where DL RS is transmitted, the DL RS is mapped to predetermined subcarriers.

Processing in the layer 1 processing unit 2081 for multiplexing the physical downlink control channel, the physical downlink shared channel and the DL RS, and mapping them to subcarriers is described in more detail with reference to FIG. 6B.

The layer 1 processing unit 2081 includes a data signal processing unit 208102, a serial parallel conversion unit (S/P) 20814, a multiplexing unit (MUX) 20816, an inverse fast Fourier transform unit (IFFT) 20818, a cyclic prefix (CP) adding unit 208110, a digital analog conversion unit (D/A) 208112, and a reference signal generation unit 208114.

The data signal processing unit 20812 includes an encoder 208102A, a data modulator 208102B, and an interleaver 208102C. The reference signal generation unit 208114 includes a multiplier 208114A and a multiplier 208114B.

The data signal processing unit 208102 performs processing for data signals transmitted in the downlink. The encoder 208102A performs channel coding for enhancing error tolerance for the data signal. Encoding may be performed using various methods such as convolution coding and Turbo coding and the like which are well known in the technical field. In the present embodiment, adaptive modulation and coding (AMC) control is performed for data signals, and channel coding rate is adaptively changed according to an instruction from the MAC processing unit 2082. The data modulator 208102B performs data modulation for data signals using a proper modulation scheme such as QPSK, 16 QAM and 64 QAM. In the present embodiment, AMC control is performed for data signals, and modulation scheme is adaptively changed according to an instruction from the MAC processing unit 2082. The interleaver 208102C permutes arranging order of bits included in the data signal according to a predetermined pattern.

Figure 6B:
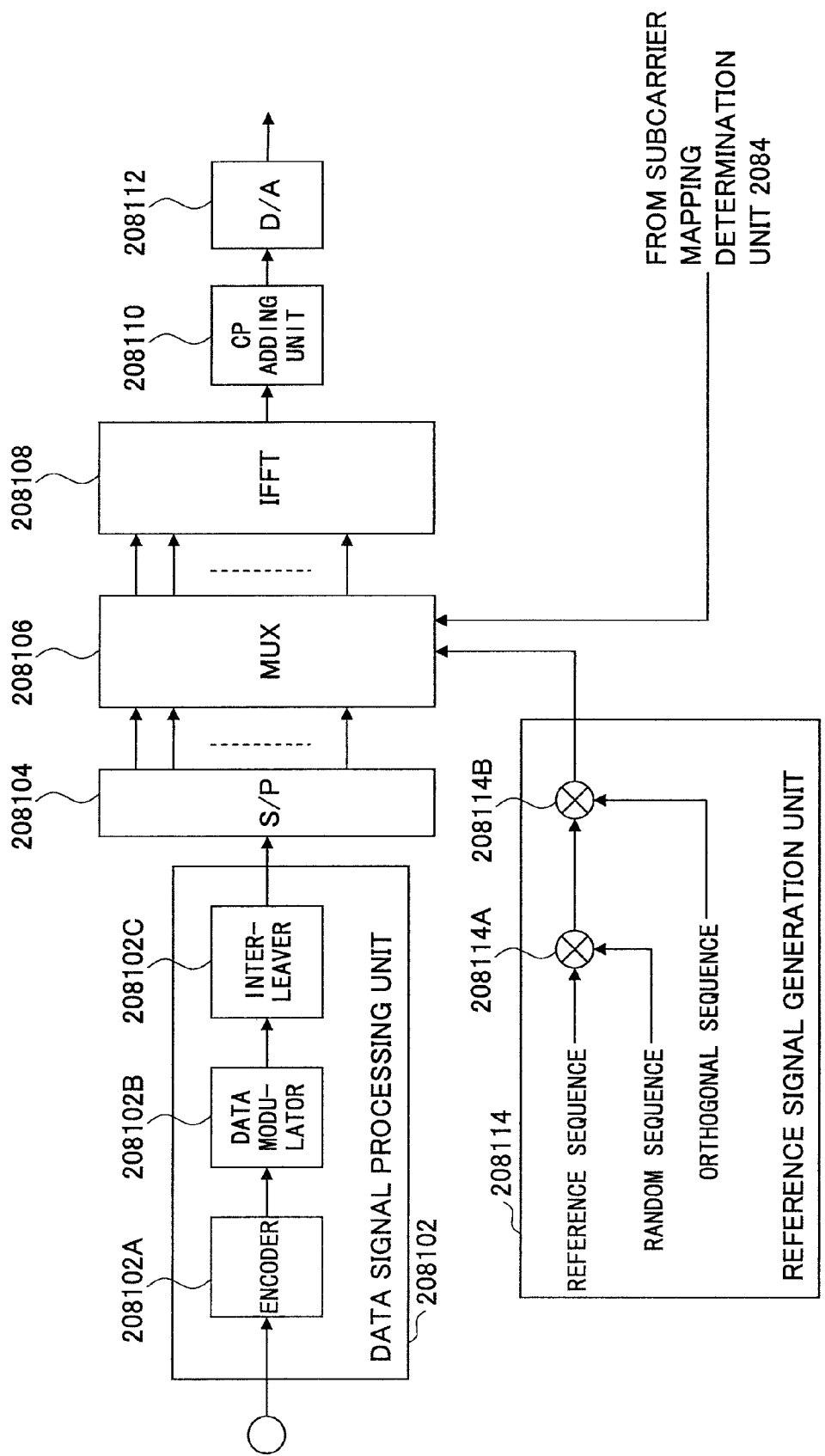
FIG. 6B is a block diagram showing detailed configuration of a layer 1 processing unit of the baseband signal processing unit.

By the way, although FIG. 6B does not show process elements for control channels, processing similar to that of data signal processing unit 208102 is performed also for control channels. However, AMC control may not be performed for control channels.

The serial parallel conversion unit (S/P) 208104 converts a serial signal sequence (stream) into parallel signal sequences. The number of parallel signal sequences may be determined according to the number of subcarriers.

The multiplexing unit (MUX) 208106 multiplexes a data sequence which represent an output signal from the serial parallel conversion unit (S/P) 208104 with the reference signal. Multiplexing can be performed in any scheme of time multiplexing, frequency multiplexing, time and frequency multiplexing. In addition to the data sequence and the reference signal, a broadcast channel may be multiplexed. The multiplexing unit (MUX) 208106 receives mapping information of the reference signal, the physical downlink control channel and the physical downlink shared channel of the subframe from the subcarrier mapping determination unit 2084, so that the multiplexing unit (MUX) 208106 multiplexes the data sequence and the reference signal based on the mapping information. That is, the multiplexing unit (MUX) 208106 maps the data sequence and the reference signal to the subcarrier based on the mapping information. The mapping information of the reference signal, the physical downlink control channel and the physical downlink shared channel includes information of after-mentioned DTX subcarrier. That is, the multiplexing unit (MUX) 208106 does not map any signal in the DTX subcarrier.

The inverse fast Fourier transform unit (IFFT) 208108 performs inverse fast Fourier transform on an input signal to perform modulation of the OFDM scheme.

The CP adding unit 208110 generates a transmission symbol by adding Cyclic Prefix (CP) to a symbol modulated by the OFDM scheme. There are two types of CP lengths which are Long CP and Short CP, and one of them is selected for each cell.

The digital analog conversion unit (D/A) 208112 converts a baseband digital signal into an analog signal.

The reference signal generation unit 208114 multiplies a reference signal by a random code sequence which is a first sequence and an orthogonal code sequence which is a second sequence to prepare the reference signal.

In addition, the layer 1 processing unit 2081 sets transmission power (transmission power density per unit band or power density per one subcarrier) of a subcarrier to which the physical downlink control channel and the physical downlink shared channel are mapped based on transmission power information reported from the DL transmission power control unit 2085. Further, the layer 1 processing unit 2081 sets transmission power of a subcarrier to which the DL RS is mapped. The transmission power of the subcarrier to which the DL RS is mapped may be set by being signaled from an upper node, or may be set by referring to a value stored in the base station apparatus 200 as a parameter.

The MAC processing unit 2082 performs downlink data MAC retransmission control such as HARQ transmission processing, scheduling, selection of transmission format, assignment of frequency resources, and the like. The scheduling indicates processing for selecting a user apparatus which performs data signal transmission by using a shared channel in the subframe. For example, as an algorithm for the selection, round robin or proportional fairness may be used. In addition, selection of transmission format indicates determining a modulation scheme, a coding rate and a data size for a data signal to be transmitted to the user apparatus selected by the scheduling. The determination of the modulation scheme, the coding rate and the data size is performed based on CQI that is reported from the user apparatus in the uplink. Further, assignment of the frequency resources indicates processing for determining resource blocks (RB) used for transmitting a data signal to the user apparatus selected in the scheduling. The determination of the resource blocks is performed based on CQI reported from the user apparatus in the uplink, for example.

In addition, the MAC processing unit 2082 performs reception processing of MAC retransmission control for uplink data, scheduling, selection of transmission format, assignment of frequency resources and the like.

The RLC processing unit 2083 performs segmentation/concatenation, transmission processing in RLC layer such as transmission processing of RLC retransmission control and the like for downlink packet data, and performs segmentation/concatenation, reception processing of RLC layer such as reception processing of RLC retransmission control and the like for uplink data. In addition, the RLC processing unit 2083 may perform PDCP layer processing in uplink and downlink.

The subcarrier mapping determination unit 2084 determines subcarriers to which the physical downlink shared channel (PDSCH) is mapped for each subframe. The determined subcarrier number to which PDSCH and the like is mapped is reported to the layer 1 processing unit 2081 as subcarrier information.

The subcarrier mapping determination unit 2084 stores, in a memory, information representing correspondence relationship among subcarrier numbers of the reference signal, number of after-mentioned DTX subcarriers and the subcarrier numbers (alternatively, the information may be provided from other processing element as necessary). Concrete examples for the correspondence relationship are described later with reference to FIG. 9A and the like.

In the following description, OFDM symbol #4 is presented as an example of an OFDM symbol to which the downlink reference signal and the physical downlink shared channel (PDSCH) are mapped, and OFDM symbol #5 is presented as an example of an OFDM symbol to which only the physical downlink shared channel (PDSCH) is mapped. Similar explanation is applied to other OFDM symbols to which the downlink reference signal and the physical downlink shared channel (PDSCH) are mapped, and other OFDM symbols to which only the physical downlink shared channel (PDSCH) is mapped.

FIG. 7 shows a subcarrier mapping example of an OFDM symbol (OFDM symbol #4) to which the downlink reference signal and the physical downlink shared channel (PDSCH) are mapped, and an OFDM symbol (OFDM symbol #5) to which only the physical downlink shared channel (PDSCH) is mapped. In this example, transmission power per one subcarrier of the downlink reference signal is the same as transmission power per one subcarrier of the physical downlink shared channel (PDSCH).

In this case, even though a part of subcarriers, in the OFDM symbol #4, where the DL RS is not mapped are not set to be subcarriers in which mapping of any data is prohibited, transmission power per one subcarrier of the physical downlink shared channel (PDSCH) in the OFDM symbol #4 becomes the same as transmission power per one subcarrier of the physical downlink shared channel (PDSCH) in the OFDM symbol #5. That is, as shown in the figure, the subcarrier mapping determination unit 2084 can map PDSCH to all subcarriers to which the reference signal (DL RS) is not mapped in the OFDM symbol #4.

FIG. 8 shows a subcarrier mapping example of an OFDM symbol (OFDM symbol #4) to which the downlink reference signal and the physical downlink shared channel (PDSCH) are mapped, and an OFDM symbol (OFDM symbol #5) to which only the physical downlink shared channel (PDSCH) is mapped. In this example, transmission power of the downlink reference signal per one subcarrier is 3 dB greater than (twice as large as) transmission power of the physical downlink shared channel (PDSCH) per one subcarrier.

In this case, a part of subcarriers in the OFDM symbol #4 to which DL RS is not mapped is set to be subcarriers where mapping of any data is prohibited, so that transmission power of the physical downlink shared channel (PDSCH) per one subcarrier in the OFDM symbol #4 is set to be the same as the transmission power of the physical downlink shared channel (PDSCH) per one subcarrier in the OFDM symbol #5. That is, as shown in the figure, the subcarrier mapping determination unit 2084 sets subcarriers to which any of the downlink reference signal (DLRS) and the physical downlink shared channel (PDSCH) is not mapped.

For example, in the figure, subcarriers of 6×n+2 (n is an integer equal to or greater than 0) become the subcarriers to which any of the downlink reference signal (DLRS) and the physical downlink shared channel (PDSCH) is not mapped. The subcarrier may be called "prohibited subcarrier" in the sense that mapping of any data is prohibited, or may be called "puncturing subcarrier" in the sense that puncturing is performed. Or, the subcarrier may be called "DTX subcarrier" in the sense that data transmission is not performed by the subcarrier. That is, no signal is transmitted by the DTX subcarrier. Then, in the OFDM symbol #4, the physical downlink shared channel is mapped to a subcarrier, which is not the DTX subcarrier, to which the downlink reference signal is not mapped. In the OFDM symbol #5, the physical downlink shared channel PDSCH is mapped to every subcarrier.

By providing the DTX subcarrier, as a result, the number of subcarriers in the OFDM symbol #4 in FIG. 8 where PDSCH is mapped becomes less than the number of subcarriers in the OFDM symbol #4 where downlink PDSCH is mapped in FIG. 7. Instead, when total transmission power assigned per one OFDM symbol is the same between FIGS. 7 and 8, transmission power density of the physical downlink shared channel can be set to be the same in any OFDM symbol (#4 in FIG. 7, #4 and #5 in FIG. 8) (however, the reference signal is transmitted with greater power than that of other signals).

More detailed description is given as follows. It is assumed that the maximum transmission power of the base station is 20 W and that the number of all subcarriers in one OFDM symbol is 300. At this time, assuming that transmission power of each subcarrier is the same, transmission power $P_{subcarrier}$ per one subcarrier is represented as follows.

$$P_{subcarrier}=20/300=0.066666(W)$$

It is assumed that 50 DTX subcarriers and 50 subcarriers for DL RS are prepared in the OFDM symbol #4, and that transmission power $P_{DLRS}$ per one subcarrier of the DL RS is $P_{DLRS}=2=0.066666=0.133333$ (W). In this case, the number of subcarriers in the OFDM symbol #4 to which the physical downlink shared channel (PDSCH) can be mapped is 300−50−50=200. This calculation indicates subtracting the number of subcarriers of the DL RS and the number of DTX subcarriers from the number of all subcarriers. In this case, assuming that transmission power of each subcarrier to which PDSCH is mapped in the OFDM symbol #4 is the same, transmission power $P_{subcarrier}^{(1)}$ per one subcarrier in the OFDM symbol #4 becomes as follows.

$$P_{subcarrier}^{(1)}=(20-0.133333\times 50)/200=0.066666.$$

On the other hand, in the OFDM symbol #5 following the OFDM symbol #4, the reference signal is not mapped, and PDSCH is mapped to all subcarriers. Therefore, assuming that transmission power of each subcarrier to which PDSCH is mapped in the OFDM symbol #5 is the same, transmission power $P_{subcarrier}^{(2)}$ per one subcarrier in the OFDM symbol #5 becomes as follows.

$$P_{subcarrier}^{(2)}=P_{subcarrier}=20/300=0.066666$$

That is, when PDSCH is mapped to two OFDM symbols, transmission power (density) of PDSCH in the first OFDM symbol #4 can be set to be the same as transmission power (density) of PDSCH in the following OFDM symbol #5. That is, when the number of OFDM symbols to which PDSCH is mapped is two or more, by decreasing the number of subcarriers (by setting DTX subcarriers) to which PDSCH is mapped in the OFDM symbol #4 in which the DL RS is transmitted, transmission power density of PDSCH can be kept constant in any OFDM symbols, so that amplitude estimation accuracy can be improved.

Next, it is described in more detail how the reference signal and the DTX subcarriers are mapped. Generally, in an OFDM symbol to which the reference signal is mapped, the reference signal is mapped at a rate of one signal per a predetermined number of subcarriers (every six subcarriers, for example). Assuming that a subcarrier number to which the reference signal is mapped is X, X can be represented as follows.

$$X = 6m + n_{shift}$$

In the equation, m is an integer equal to or greater than 0, $n_{shift}$ is an amount set for each cell, and is a value of 0, 1, ... and 5. More generally, as described in the "background art", $n_{shift}$ is represented as $[\upsilon + f_{hop}(j)]$ mod 6 (j is the maximum number in integers that does not exceed i/2). The physical downlink shared channel (PDSCH) is mapped to subcarriers other than subcarriers to which the reference signal is mapped. As mentioned later, the puncturing subcarrier may be included.

The transmission power per one subcarrier (transmission power density per unit band) of the physical downlink shared channel (PDSCH) is set to be a predetermined value regardless of whether the downlink reference signal is mapped in the OFDM symbol to which PDSCH is mapped. The predetermined value is the same as the transmission power density in the case where the base station performs transmission with maximum transmission power (rated power) and power is evenly distributed in all subcarriers in the system band. Therefore, in the OFDM symbol in which the downlink reference signal is transmitted, subcarriers to which PDSCH can be mapped are reduced according to transmission power density of the downlink reference signal (Offset value with respect to other signal). In other words, prohibited subcarrier (DRX subcarrier or puncturing subcarrier) to which mapping of PDSCH is prohibited is set.

In the above-mentioned example, transmission power per one subcarrier (transmission power density per unit band) of the physical downlink shared channel (PDSCH) is set to be transmission power density of a case where the base station performs transmission with maximum transmission power (rated power) and power is evenly distributed in all subcarriers in the system band. But, transmission power per one subcarrier (transmission power density per unit band) of the physical downlink shared channel (PDSCH) is not limited to be the above value. Other fixed value may be used.

FIG. 9A shows correspondence relationship between the number of puncturing subcarriers and the subcarrier number. In the figure, X indicates a subcarrier number of a subcarrier to which a reference signal is mapped, wherein the reference signal corresponds to a smaller subcarrier number in two reference signals in one resource block ($X = 6m + n_{shift}$). Twelve subcarriers are included in one resource block, and subcarrier numbers (0, 1, 2, ..., 11) are set in ascending order of frequency from the low frequency side.

When a plurality of puncturing subcarriers are set per one resource block, mapping is carried out such that puncturing subcarriers are evenly distributed as much as possible. For example, when X=0 and the number of puncturing subcarriers is 4, the subcarrier number is set every three subcarriers, like 1, 4, 7, 10. Or, when more than two puncturing subcarriers are set in an OFDM symbol in a resource block, at least three puncturing subcarriers are set at even subcarrier intervals.

The mapping example shown in the figure is merely an example. For example, when the number of puncturing subcarriers per one resource block is small (when the number is 1, 2 or 3, for example), the puncturing subcarrier may be set such that the puncturing subcarrier is not adjacent to the reference signal. This is because channel estimation accuracy for signals near the reference signal is expected to be relatively good.

For example, when the number of puncturing subcarriers is 2, the puncturing subcarriers may be placed at positions of (X+3) mod 12 and (X+10) mod 12. More generally, it is preferable that signals other than the reference signal are mapped to subcarriers existing between a subcarrier to which the reference signal is mapped and a puncturing subcarrier as much as possible.

Or, the subcarrier to which the reference signal is mapped and the puncturing subcarrier can be placed such that position relationship of them or distance between them (subcarrier interval) is constant. For example, as shown in FIG. 9A, by defining the subcarrier number as (X+a) mod 12 (a is an integer from 0 to 11), the distance (subcarrier interval) becomes a value based on a. Thus, by fixing the value of a, position relationship between the subcarrier to which the reference signal is mapped and the puncturing subcarrier or the distance (subcarrier interval) of them becomes constant regardless of the value of X. In this case, since channel estimation accuracy for demodulating PDSCH becomes constant, more stable transmission characteristics can be obtained.

Alternatively, assuming that the base station apparatus 200 includes a plurality of transmission antennas, the subcarrier number of the puncturing subcarrier may include a subcarrier number of a subcarrier to which a reference signal is mapped, which reference signal is transmitted from a transmission antenna which is different from a transmission antenna relating to the puncturing subcarrier.

For example, in the case of P=0, 1 described in the background art, subcarrier numbers of puncturing subcarriers when P=0 may include a subcarrier number of a subcarrier to which the reference signal is mapped when p=1. More particularly, assuming that a subcarrier number X1 of the reference signal when p=0 is $X1 = 6m + n_{shift}$, a subcarrier number X2 of the reference signal when p=1 is $X2 = 6m + 3 + n_{shift}$. Thus, subcarrier numbers of the puncturing subcarriers when p=0 include $6m + 3 + n_{shift}$. FIG. 9B shows correspondence relationship between the number of puncturing subcarriers and the subcarrier number in that case.

In the above-mentioned example, numbers of puncturing subcarriers when p=0 include a subcarrier number of a subcarrier to which the reference signal is mapped when p=1. Instead of that, subcarrier numbers of puncturing subcarriers when p=1 may include a subcarrier number of a subcarrier to which the reference signal is mapped when p=0.

When the number of transmission antennas is actually two, as shown in FIG. 9C, in order to improve reception SIR of the reference signal, no signal is transmitted from a first transmission antenna in a subcarrier of a reference signal which is transmitted from a second antenna regardless of transmission power of the reference signal. In addition, no signal is transmitted from the second transmission antenna in a subcarrier of a reference signal which is transmitted from the first antenna. Thus, as shown in FIG. 9B, by configuring the system such that subcarrier numbers of subcarriers to which the reference signal transmitted by a different transmission antenna is mapped include a puncturing subcarrier number, it can be avoided that the number of physical resources, more particularly, the number of resource elements is decreased due to puncturing.

Also, when the number of transmission antenna is one, as shown in FIG. 9B, puncturing subcarrier numbers can be set by assuming that there are reference signals transmitted from the second transmission antenna. Accordingly, similar processing can be performed between the case when the number of antenna is one and the case when the number is two. Thus, it becomes possible to reduce complexity of the base station apparatus performing transmission processing and the mobile station performing reception processing.

The relationship between the first antenna and the second antenna can be applied to relationship between a third antenna and a fourth antenna.

FIG. 10 shows how many puncturing subcarriers are provided in what resource block RB for various offset values when the system bandwidth is 5 MHz. The offset value indicates how much decibel by which the reference signal is stronger than other signal for transmission. For example, when the reference signal is transmitted 3 dB more strongly than other signal, two subcarriers of twelve subcarriers are set as puncturing subcarriers in every resource block. When the reference signal is transmitted 1 dB more strongly than other signal, one puncturing subcarrier is set for each even number resource block, and no puncturing subcarrier is set in other resource blocks (odd number resource blocks).

FIGS. 11 and 12 show how many puncturing subcarriers are provided in what resource block RB for various offset values when the system bandwidth is 10 MHz and 20 MHz respectively. Configurations of the tables are similar to that in FIG. 10.

In FIGS. 10-12, since puncturing subcarriers are set such that the offset value becomes 0, 1, 2, . . . , 6 dB, the number of puncturing subcarriers is not necessarily the same among resource blocks. However, such a setting method is not essential for the present invention. The system may be configured such that the number of puncturing subcarriers is the same among all resource blocks, and instead, the offset value can be set as a non-integer value. For example, FIG. 12B shows transmission power value (offset value) of the reference signal when the number of puncturing subcarriers set in each resource block is 1, 2, 3, 4, 5 or 6.

The example is described in more detail. A case is considered in which the system bandwidth is 5 MHz (the number of subcarriers is 300, the number of subcarriers of the reference signal is 50, and the number of resource blocks is 25), and in which the number of puncturing subcarrier set in each resource block is 1. In this case, since the number of puncturing subcarrier of each resource block (the number of subcarriers per one resource block is 12) is 1, the number of mapping subcarriers of PDSCH becomes 225. In this case, assuming that the absolute value of transmission power of one subcarrier of PDSCH is 1, total transmission power of an OFDM symbol in which the reference signal is transmitted is $50 \times 1 \times 10^{1.76/10} + 225 \times 1 = 299.98$, and total transmission power in an OFDM symbol in which the reference signal is not transmitted is $300 \times 1 = 300$. Thus, total transmission power in an OFDM symbol in which the reference signal is transmitted can be set to be almost the same as total transmission power in an OFDM symbol in which the reference signal is not transmitted. Although a case where the number of puncturing subcarrier is 1 in each RB is described in the above-mentioned example, total transmission power in an OFDM symbol in which the reference signal is transmitted can be set to be almost the same as total transmission power in an OFDM symbol in which the reference signal is not transmitted similarly when the number of puncturing subcarriers is 2, 3, 4, 5 or 6 in each RB. In addition, total transmission power in an OFDM symbol in which the reference signal is transmitted can be set to be almost the same as total transmission power in an OFDM symbol in which the reference signal is not transmitted similarly when the system bandwidth is other than 5 MHz, for example, when the system bandwidth is 10 MHz or 20 MHz.

In this case, since the number of subcarriers to be punctured becomes constant in each resource block, it becomes possible to reduce complexity of the base station apparatus for performing transmission processing and the mobile station for performing reception processing.

The DL transmission power control unit 2085 determines transmission power of the physical downlink control channel and the physical downlink shared channel, and reports the transmission power to the layer 1 processing unit 2081. Transmission power per one subcarrier (transmission power density per unit band) of the physical downlink shared channel is set to be a predetermined value regardless of whether the downlink reference signal is mapped to an OFDM symbol to which PDSCH is mapped. The predetermined value is equal to transmission power density obtained when the base station performs transmission using the maximum transmission power (rated power) and power is evenly distributed to all subcarriers in the system band. Or, the transmission power per one subcarrier (transmission power density per unit band) of the physical downlink shared channel may be a value other than the transmission power density obtained when the base station performs transmission using the maximum transmission power (rated power) and power is evenly distributed to all subcarriers in the system band, as long as the transmission power per one subcarrier (transmission power density per unit band) of the physical downlink shared channel is constant regardless of whether the downlink reference signal is mapped.

The user apparatus $100_n$ of an embodiment of the present invention is described with reference to FIG. 13A.

Figure 13A:
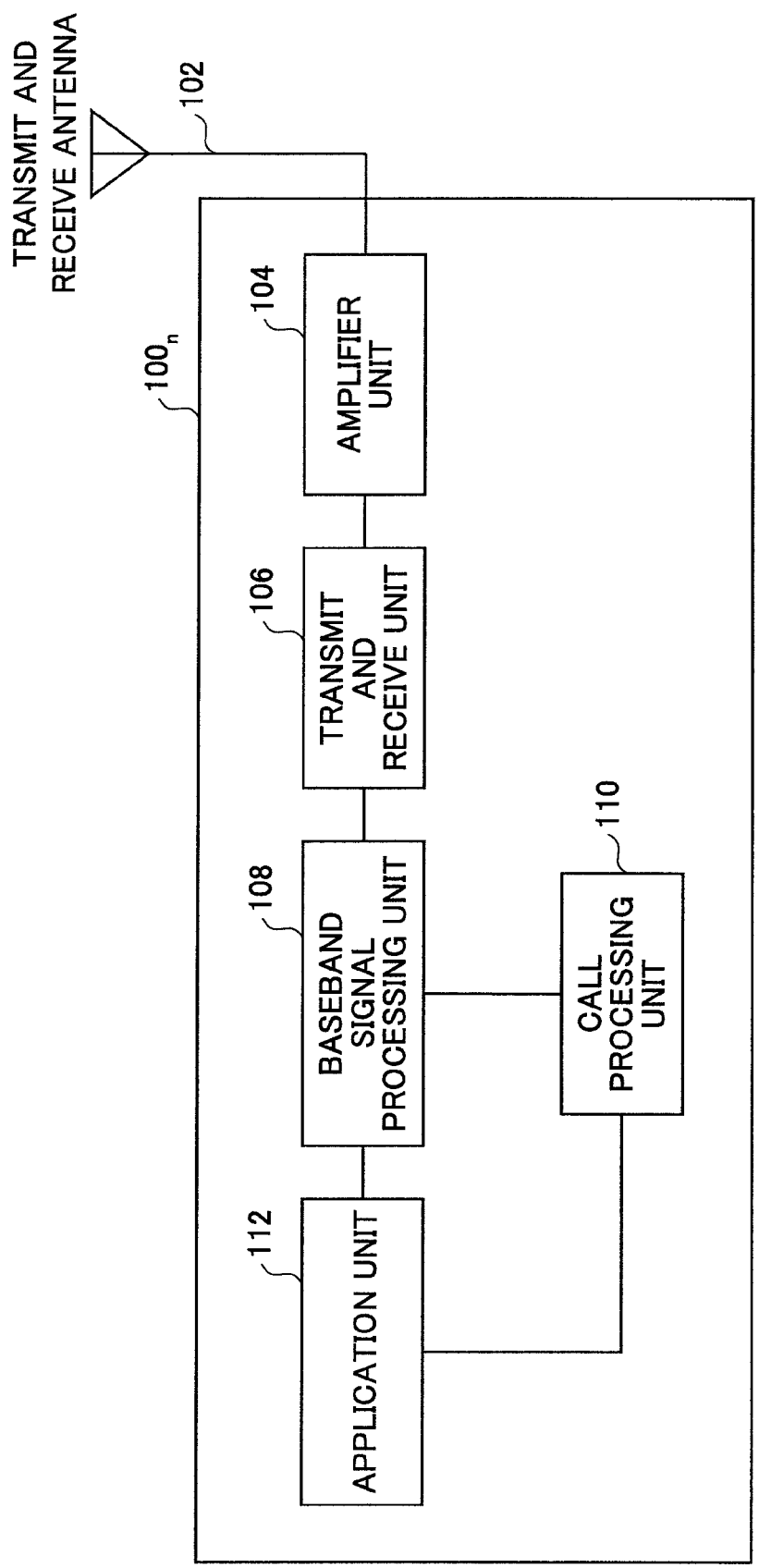
FIG. 13A is a partial block diagram showing a user apparatus according to an embodiment of the present invention.

As shown in FIG. 13A, the user apparatus $100_n$ includes a transmit and receive antenna 102, an amplifier unit 104, a transmit and receive unit 106, a baseband signal processing unit 108, a call processing unit 112, and an application unit 112.

As to downlink data, a radio frequency signal received by the transmit and receive antenna 102 is amplified by the amplifier unit 104, and is frequency-converted by the transmit and receive unit 106 so that the signal is converted into a baseband signal. The baseband signal processing unit 108 performs, on the baseband signal, FFT processing, error correction decoding, reception processing of retransmission control, and the like. After that, the processed signal is transferred to the application unit 112.

On the other hand, uplink packet data is input to the baseband signal processing unit 108 from the application unit 112. The baseband signal processing unit 108 performs transmission processing of retransmission control (HARQ), transmission format selection, channel coding, DFT processing, IFFT processing and the like, then, the processed signal is transferred to the transmit and receive unit 106.

The transmit and receive unit 106 performs frequency conversion processing for converting the baseband signal output from the baseband signal processing unit 108 into radio frequency band. After that, the processed signal is amplified in the amplifier unit 104 and transmitted from the transmit and receive antenna 102.

In addition, the baseband signal processing unit 108 performs demodulation and decoding for the physical downlink control channel, and performs processing for obtaining information of the physical downlink control channel and the physical downlink shared channel. The user apparatus $100_n$ obtains beforehand information (including information specifying where prohibited subcarriers are placed) indicating subcarriers where the information of the physical downlink shared channel is mapped. The processing for obtaining information of the physical downlink shared channel is performed based on the information indicating subcarriers to which the physical downlink shared channel is mapped.

Figure 13B:
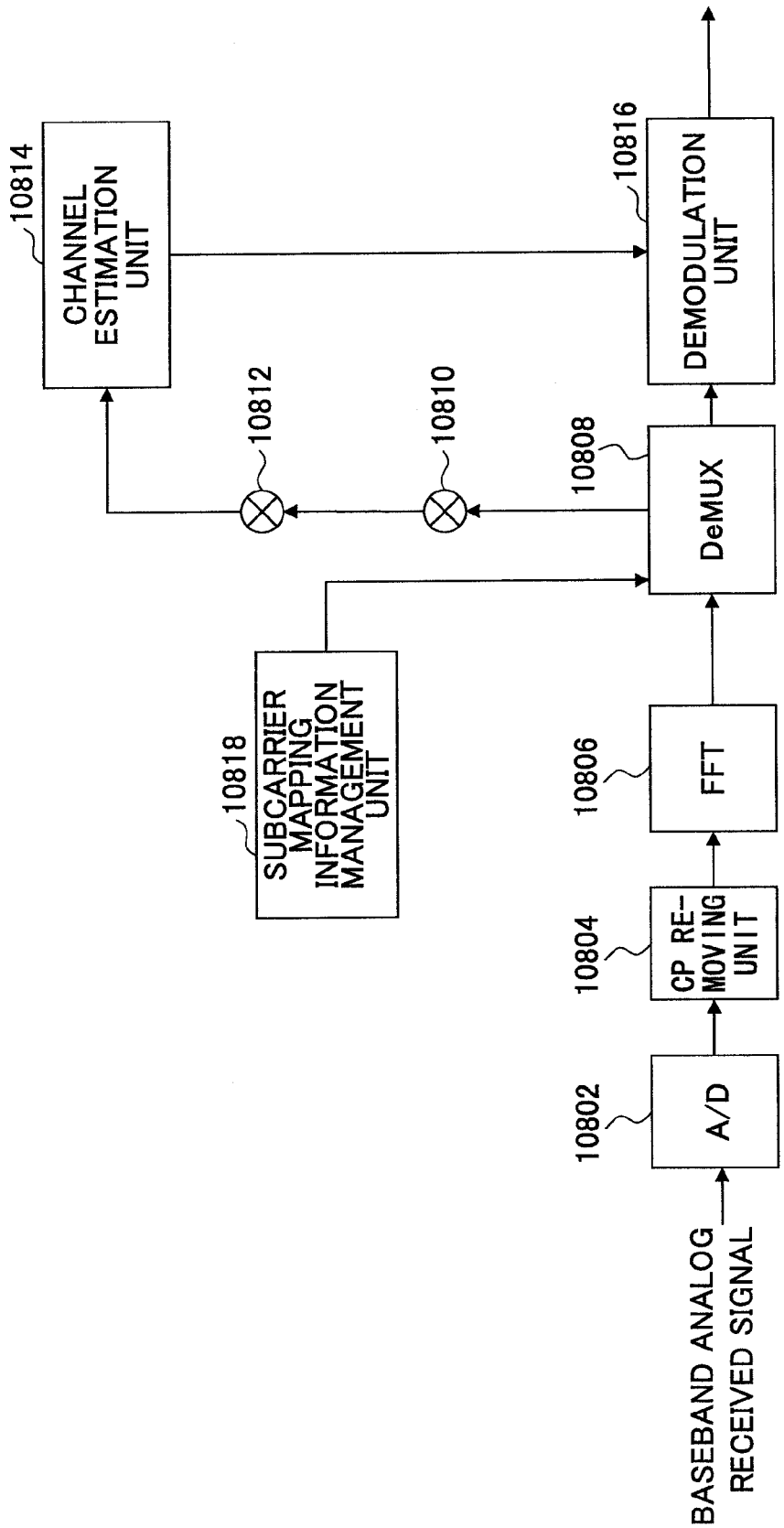
FIG. 13B is a diagram showing details of the baseband processing unit.

More detailed explanation is given with reference to FIG. 13B for explaining processing, in the baseband signal processing unit 108, for performing demodulation/decoding of the physical downlink control channel and obtaining information of the physical downlink control channel and the physical downlink shared channel and the like.

The baseband signal processing unit 108 includes analog digital converter (A/D) 10802, a CP removing unit 10804, a fast Fourier transform unit (FFT) 10806, a demultiplexing unit (DeMUX) 10808, a multiplying unit 10810, a multiplying unit 10812, a channel estimation unit 10814, a demodulation unit 10816, and a subcarrier mapping information management unit 10818.

The analog digital converter (A/D) 10802 converts an analog signal of the received baseband signal into a digital signal.

The CP removing unit 10804 removes CP from a received signal to obtain an effective symbol part.

The fast Fourier transform unit (FFT) 10806 performs fast Fourier transform on an input signal to perform demodulation of OFDM scheme.

The demultiplexing unit (DeMUX) 10808 demultiplexes the reference signal, the data signal (user data or control data) from the received signal. The demultiplexing unit (DeMUX) 10808 receives, from the subcarrier mapping information management unit 118, mapping information of the reference signal, the physical downlink control channel and the physical downlink shared channel. That is, the demultiplexing unit (DeMUX) 10808 receives information indicating which subcarrier the reference signal is mapped to in the subframe, and which subcarrier the physical downlink control channel (control data) and the physical downlink shared channel (user data) are mapped to. Then, the demultiplexing unit (DeMUX) 10808 demultiplexes the reference signal and the data signal (user data or control data) from the received signal based on the information.

The multiplying units 10810, 10812 multiply the reference signal by a random code sequence which is a first sequence and an orthogonal code sequence which is a second sequence.

The channel estimation unit 10814 performs channel estimation based on the reference signal, and determines how channel compensation should be applied to the received data signal.

The demodulation unit 10816 compensates for the data signal based on the channel estimation result, and restores the data signal transmitted from the base station apparatus 200, that is, restores user data or control data.

The subcarrier mapping information management unit 10818 stores mapping information of the reference signal, the physical downlink control channel and the physical downlink shared channel, that is, the subcarrier mapping information management unit 10818 stores information indicating which subcarrier the reference signal is mapped to in the subframe, and which subcarrier the physical downlink control channel (control data) and the physical downlink shared channel (user data) are mapped to. The subcarrier mapping information management unit 10818 reports the mapping information to the demultiplexing unit (DeMUX) 10808. The mapping information may be system specific information, or may be broadcast information, or information reported from the base station apparatus 200 by individual signaling which is RRC message, for example.

The information on DTX subcarrier is included in the mapping information of the reference signal, the physical downlink control channel and the physical downlink shared channel stored in the subcarrier mapping information management unit 10818. That is, the demultiplexing unit (DeMUX) 10808 performs processing for demultiplexing the reference signal and the data signal (user data or control data) while regarding that no signal is mapped in the DTX subcarrier.

The information indicating which subcarrier the physical downlink shared channel is mapped to (including information for specifying the position of the prohibited subcarrier) corresponds to the subcarrier number of the puncturing subcarrier described with reference to FIGS. 9A, 9B, 9C, 10, 11, 12A and 12B in the explanation of the base station apparatus 200, for example. In other words, the user apparatus $100_n$ performs demodulation and decoding for the physical downlink shared channel in consideration of the puncturing subcarrier described with reference to FIGS. 9A, 9B, 9C, 10, 11, 12A and 12B in the explanation of the base station apparatus 200. In other words, the user apparatus $100_n$ performs demodulation and decoding for the physical downlink shared channel by considering that the physical downlink shared channel is not transmitted in the puncturing subcarrier described with reference to FIGS. 9A, 9B, 9C, 10, 11, 12A and 12B in the explanation of the base station apparatus 200. The demodulation and decoding include FFT processing of the baseband signal processing unit 108, error correction decoding, reception processing of retransmission control, and the like.

That is, as mentioned above, in the case when the puncturing subcarrier number is set by assuming that there is the reference signal transmitted from the second transmission antenna, as shown in FIG. 9B, even when the base station apparatus has only one transmission antenna, the baseband signal processing unit 108 performs demodulation and decoding of the physical downlink shared channel by assuming that there is the reference signal transmitted from the second transmission antenna as shown in FIG. 9B even when the number of transmission antenna is actually 1, that is, by regarding that the subcarrier to which the reference signal transmitted from the second transmission antenna is mapped is the puncturing subcarrier.

The call processing unit 110 performs management of communication with the base station 200, and the application unit 112 performs processing on an upper layer higher than the physical layer and the MAC layer.

In the above-mentioned example, the puncturing subcarrier is set in the OFDM symbol in which the physical downlink shared channel (PDSCH) is transmitted, and the subcarrier of the puncturing subcarrier is determined based on the subcarrier position of the downlink reference signal. Instead of that, the puncture subcarrier may be set in the OFDM symbol in which the physical downlink control channel (PDCCH) is transmitted, and the subcarrier of the puncturing subcarrier may be determined based on the subcarrier position of the downlink reference signal. Or, the puncturing subcarrier may be set in the OFDM symbol in which PCFICH or PHICH is transmitted, and the subcarrier of the puncturing subcarrier may be determined based on the subcarrier position of the downlink reference signal.

Since the subcarrier number of the puncturing subcarrier is associated with the subcarrier number to which the downlink reference signal is mapped on a one-to-one basis as shown in FIGS. 9A and 9B, the base station apparatus, the user apparatus and the method of the present embodiment can be applied for any sequence of $f_{hop}(j)$ described in the background art. That is, the base station apparatus, the user apparatus and the method of the above embodiments can be applied even when hopping is applied to the downlink reference signal and even when fixed shifting is applied.

In the above embodiments, although examples are described in a system to which Evolved UTRA and UTRAN (another name: Long Term Evolution or Super 3G) is applied, the base station apparatus, the user apparatus and the method of the present invention can be applied to every system using the OFDM scheme in the downlink.

According to the embodiment of the present invention, by preparing correspondence relationship among number, location, offset value and the like of the reference signal and the prohibited subcarrier, changes in hopping and offset value of the reference signal can be flexibly supported while transmission power density of non-reference signal (typically, data signal) is kept constant temporally.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-50837, filed in the JPO on Feb. 28, 2007, and the entire contents of the Japanese patent application No. 2007-50837 are incorporated herein by reference.

The present international application claims priority based on Japanese patent application No. 2007-71589, filed in the JPO on Mar. 19, 2007, and the entire contents of the Japanese patent application No. 2007-71589 are incorporated herein by reference.

The invention claimed is:

1. A base station apparatus that performs communication with a user apparatus using orthogonal frequency division multiplexing (OFDM) in a downlink, comprising:
   a generation unit configured to perform inverse Fourier transform on a signal to which a first signal and a second signal are mapped so as to generate a transmission signal; and
   a transmission unit configured to transmit the transmission signal to the user apparatus,
   wherein, when the number of transmission antennas of the base station apparatus is two, mapping of the second signal to a subcarrier to which the first signal is to be mapped in a first transmission antenna is prohibited in a second transmission antenna, and
   wherein, even when the number of transmission antenna of the base station apparatus is one, a particular subcarrier in which mapping of the second signal is prohibited is determined by assuming that the number of transmission antennas of the base station apparatus is two such that the particular subcarrier becomes the same as the subcarrier in which mapping of the second signal is prohibited in the second transmission antenna which is used when the number of transmission antennas of the base station apparatus is two.

2. The base station apparatus as claimed in claim 1, wherein the first signal is a downlink reference signal, and the second signal is a physical downlink shared channel or a physical downlink control channel.

3. The base station apparatus as claimed in claim 2, wherein, when the number of the transmission antenna of the base station apparatus is one, the base station apparatus punctures a subcarrier of the downlink reference signal to be transmitted from the second transmission antenna by assuming that the downlink reference signal transmitted from the second transmission antenna exists.

4. A base station apparatus that performs communication with a user apparatus using orthogonal frequency division multiplexing (OFDM) in a downlink, comprising:
   a generation unit configured to perform inverse Fourier transform on a signal to which a first signal and a second signal are mapped so as to generate a transmission signal; and
   a transmission unit configured to transmit the transmission signal to the user apparatus,
   wherein the first signal is a downlink reference signal,
   when the second signal is a physical downlink control channel, even if the number of transmission antenna of the base station apparatus is one, a subcarrier in which mapping of the physical downlink control channel is prohibited is determined by assuming that the number of transmission antennas of the base station apparatus is two, and
   when the second signal is a physical downlink shared channel, the physical downlink shared channel is mapped to a subcarrier other than a subcarrier to which the downlink reference signal is mapped if the number of transmission antenna of the base station apparatus is one.

5. A method for use in a base station apparatus that performs communication with a user apparatus using orthogonal frequency division multiplexing (OFDM) in a downlink, comprising the steps of:
   performing inverse Fourier transform on a signal to which a first signal and a second signal are mapped so as to generate a transmission signal; and
   transmitting the transmission signal to the user apparatus,
   wherein, when the number of transmission antennas of the base station apparatus is two, mapping of the second signal to a subcarrier to which the first signal is to be mapped in a first transmission antenna is prohibited in a second transmission antenna, and
   wherein, even when the number of transmission antenna of the base station apparatus is one, a particular subcarrier in which mapping of the second signal is prohibited is determined by assuming that the number of transmission antennas of the base station apparatus is two such that the particular subcarrier becomes the same as the subcarrier in which mapping of the second signal is prohibited in the second transmission antenna which is used when the number of transmission antennas of the base station apparatus is two.

6. A mobile communication system comprising a user apparatus and a base station apparatus that performs communication with the user apparatus using orthogonal frequency division multiplexing (OFDM) in a downlink, the base station apparatus comprising:
   a generation unit configured to perform inverse Fourier transform on a signal to which a first signal and a second signal are mapped so as to generate a transmission signal; and
   a transmission unit configured to transmit the transmission signal to the user apparatus,
   wherein, when the number of transmission antennas of the base station apparatus is two, mapping of the second signal to a subcarrier to which the first signal is to be mapped in a first transmission antenna is prohibited in a second transmission antenna, and
   wherein, even when the number of transmission antenna of the base station apparatus is one, a particular subcarrier in which mapping of the second signal is prohibited is determined by assuming that the number of transmission antennas of the base station apparatus is two such that the particular subcarrier becomes the same as the subcarrier in which mapping of the second signal is prohibited in the second transmission antenna which is used when the number of transmission antennas of the base station apparatus is two.

* * * * *